METHODS OF RECORDING DIGITAL INFORMATION

Filed Nov. 13, 1951 15 Sheets-Sheet 1

Edward Arthur Newman
Donald Watts Davies
David Osmond Clayden
Inventors
By
Stevens, Davis, Miller & Mosher
Attorneys July 29, 1958 E. A. NEWMAN ET AL 2,845,609

METHODS OF RECORDING DIGITAL INFORMATION

Filed Nov. 13, 1951 15 Sheets-Sheet 2

Edward Arthur Newman
Donald Watts Davies
David Oswald Clayden
Inventors

By
Stevens, Davis, Miller & Mosher
their Attorneys

METHODS OF RECORDING DIGITAL INFORMATION

Filed Nov. 13, 1951 15 Sheets-Sheet 3

Edward Arthur Newman
Donald Watts Davies
David Osmond Clayden
*Inventors*

By
Stevens, Davis, Miller & Mosher
their Attorneys

Edward Arthur Newman
Donald Watts Davies
David Osyth Clayden
Inventors

By
Stevens Davis Miller & Mosher
their Attorneys

METHODS OF RECORDING DIGITAL INFORMATION

Filed Nov. 13, 1951 15 Sheets-Sheet 5

Edward Arthur Newman
Donald Watts Davies
David Osyth Clayden
Inventors
By
Stevens, Davis, Miller & Mosher
their Attorneys Edward Aston Newman
Donald Watts Davies
David Osward Clayden
Inventors
By
Stevens, Davis, Miller & Mosher
their Attorneys Edmund Arthur Newman
Donald Watts Davies
David Oswald Clayden
*Inventors*
By
Stevens, Davis, Miller & Mosher
*Attorneys*

METHODS OF RECORDING DIGITAL INFORMATION

Filed Nov. 13, 1951 15 Sheets-Sheet 8

Edward Arthur Newman
Donald Watts Davies
David Oswald Clayden
Inventors

By
Stevens, Davis, Miller & Mosher
Their Attorneys

Edward Arthur Newman
Donald Watts Davies
David Osyned Clayden
Inventors
By
Stevens, Davis, Miller & Mosher
their Attorneys

METHODS OF RECORDING DIGITAL INFORMATION

Filed Nov. 13, 1951 15 Sheets-Sheet 10

Edward Arthur Newman
Donald Watts Davies
David Oswald Clayden
Inventors

By Stevens, Davis, Miller & Mosher
their Attorneys

Edward Arthur Newman
Donald Watts Davies
David Oswald Clayden
Inventors

By
Stevens, Davis, Miller & Mosher
their Attorneys

Edward Arthur Newman
Donald Watts Davies
David Osmond Clayden
Inventors

By
Stevens, Davis, Miller & Mosher
their Attorneys

METHODS OF RECORDING DIGITAL INFORMATION

Edward Arthur Newman
Donald Watts Davies
David Osward Clayden
Inventors

By
Stevens, Davis, Miller + Mosher
their Attorneys

Edward Arthur Newman
Donald Watts Davies
David Osmond Clayden
Inventors

By
Stevens, Davis, Miller & Mosher
their Attorneys

Edward Arthur Newman
Donald Watts Davies
David Ozmond Clayden
Inventors
By
Stevens, Davis, Miller & Mosher
Attorneys

United States Patent Office 2,845,609

Patented July 29, 1958

2,845,609

METHODS OF RECORDING DIGITAL INFORMATION

Edward Arthur Newman, Teddington, Donald Watts Davies, Southsea, and David Oswald Clayden, Hanwell, London, England, assignors to National Research Development Corporation, London, England Application November 13, 1951, Serial No. 255,888

Claims priority, application Great Britain November 22, 1950

11 Claims. (Cl. 340—174)

The present invention relates to apparatus for recording electrical digit signals which occur in serial form, generally as a succession of electrical pulses. It is particularly concerned with apparatus for transferring digit signals to a store which cannot store the signals at the rate they are presented.

According to the invention, apparatus for recording a series of N electrical digit signals, which are presented cyclically in a repetitive form, in a store which requires a certain minimum time to record a digit signal which is not more than $n$ times the digit period of the signals, comprises $m$ input channels to the store, where $m$ is not more than $n$ and $n/m$ is relatively prime to N, and means for selecting a first digit signal in each successive group of $n$ consecutive digit signals and transferring this set of first digit signals through an input channel to the store, selecting a second digit signal in each successive group and transferring this set of second digit signals through an input channel to the store, and so on for the remaining digit signals in each group in such a manner that any given channel passes only one set of digit signals at a time, the arrangement being such that $m$ sets of digit signals are transferred to the store during a first presentation of the digit signals, if necessary a further $m$ sets of digit signals are transferred during a second presentation, and so on if necessary until all the digit signals are transferred. Two numbers are said to be relatively prime to one another when they do not have a common factor other than unity. Thus nine is relatively prime to 1024.

In one form only one input channel is provided, that is $m$ is one, and then the series of N signals to be transferred must be presented at least $n$ times and $n$ must be prime to N. In an alternative form, $n$ input channels may be provided, that is $m$ equals $n$, the channels operating in cyclic order so that the digit signals may be transferred as fast as they are presented during one presentation of the series of N digit signals.

In a further form of the invention a plurality of channels $m$ may be provided so that $m$ is less than $n$ and as a result the digit signals cannot be transferred during one presentation. For example if three channels are provided, every ninth digit signal starting from the first may be transferred through a first channel, every ninth digit signal starting from the fourth may be transferred through a second writing head, while every ninth signal starting from the seventh is transferred through a third writing head, with the result that all the digit signals are transferred after three presentations of the digital information, provided nine is prime to the number of digit signals in the information.

In all cases when one particular writing head is considered, it will be seen that this head is called upon to record digit signals at a frequency which is lower than the digit frequency of the digital information to be stored. The invention is therefore particularly applicable to stores which require a longer time for recording a digit signal than the digit period of the information, where the digit period is the time interval between the incidence of successive digit signals.

An example of one kind of store which requires a certain minimum time to record a digit signal which may be longer than the digit period of the information required to be stored, is a magnetic store, which may be in the form of a moving magnetic tape or a magnetic layer on the periphery of a rotating magnetic recording wheel or drum on either of which magnetization patterns representing the digit signals can be laid down by fixed recording heads. Each pattern requires a certain minimum distance along the magnetic medium of about 0.01 inch to be recorded satisfactorily, and it is therefore necessary to move the medium at least 0.01 inch with respect to the recording head or heads during a digit period before the following digit signal can be recorded. There is a practical limit to the speed at which a magnetic recording medium can be moved with the high degree of precision required both in speed and direction with respect to the associated recording heads. At the present time, for example, it is impracticable to rotate a magnetic recording wheel of 4 inches diameter at more than about 10,000 R. P. M. It thus follows that a magnetic recording wheel is a store which requires a certain minimum time, which is about 5 microseconds in the present state of the art, to satisfactorily record or reproduce a digit signal, and the invention is particularly concerned with methods of transferring at a practical frequency to or from a magnetic recording wheel, digit signals having a higher digit frequency.

The invention is particularly applicable to electronic digital computers that utilize more than one type of apparatus for storing digit signals due to the following considerations. In a theoretically ideal computer, a set of a given number of digit signals, would be stored in one particular type of high-speed (i. e. high digit frequency) store from which the constituent digit signals would become very quickly available when ordered in sequence at a high digit speed during successive very short duration digit periods. An example of this type of store is the acoustic delay line which may be used to indefinitely store a set of digit signals, the individual signals becoming available during successive digit periods of about one microsecond in an indefinitely recurring sequence.

In practice however, the use of a single type of store involves two important disadvantages. Firstly, a reasonable powerful computer which contained sufficient high-speed storage equipment to store permanently or semi-permanently all the words such as instructions, results and partial results that are frequently used would be very costly and bulky. Secondly, all known types of rapidly operating high-speed stores cannot maintain a sufficient standard of reliability to enable them to be used for this purpose in large numbers and all the information in such a store which relies upon a supply of electricity is lost when this supply fails.

It is therefore desirable in practice to provide two types of storage device in a reasonably powerful computer, one type being a high-speed store from which digit signals can be delivered at high-speed with little delay, and the other type being a permanent store which is more reliable, more economical in financial cost of storing a given number of digit signals, and of such a nature that it does not depend upon a supply of electricity for the indefinite preservation of the words stored therein.

A satisfactory type of permanent store for use in a computer is a magnetic store in the form of magnetic recording wheel which is rotated at a constant speed which is such that the wheel rotates a predetermined number of times during the time taken for the set of digit signals to emerge from one high-speed store or a number of such stores. Thus digit signals can be transferred from the high-speed store or stores to the magnetic wheel and back and occupy the same position in a master timing sequence so that each digit signal can be recognized. However as there is a definite minimum period required for the satisfactory recording of a signal on the magnetic recording wheel, it will be appreciated that, in the absence of special arrangements, if the digit signals emerging from the high-speed store are to be transferred in direct sequence to the magnetic wheel, the speed of operation of this store and therefore of the whole computer is limited to the speed of operation of the magnetic store. As high-speed stores such as the acoustic delay line are capable of operating at speeds several times in excess of the speed of operation of magnetic stores this limitation will impose a severe restraint on the working speed and therefore the output of the computer.

It is a special object of the invention to provide a computer which incorporates a magnetic store and a high-speed store in which the speed of operation of the computer is not limited by the speed of operation of the magnetic store.

In order to enable a magnetic store to operate reliably in conjunction with a high-speed store we arrange, according to a particular feature of our invention, for only one digit signal in each successive group consisting of a predetermined number $n$ of consecutive digit signals fed out from the high-speed store to be selected and transferred through a given channel to the magnetic store. It will be appreciated that this arrangement permits the recording of a digit signal in the magnetic store to take $n$ times as long as the digit period of the high-speed store. This means that the magnetic store is operating in conjunction with a store operating $n$ times as fast.

According to one arrangement, when the whole contents of the high-speed store have been fed out and partially selected in this manner, and one digit in every group of $n$ digits has been recorded, the digit signals in the high-speed store are fed out again and another digit signal in each of the successive groups is selected and recorded in the magnetic store. The whole contents of the high-speed store must be fed out $n$ times and a different digit signal in each group selected on each occasion before every digit signal in the high-speed store has been transferred to the magnetic store.

By a similar but reverse process we arrange for signals derived from magnetization patterns in the magnetic store to be read out in direct order and passed into the high-speed store in such a manner that consecutive derived signals occupy an appropriately selected digit period in each successive group of $n$ digit period throughout the high-speed store or stores, then another selected digit period in each successive group through the store or stores and so on.

The value of the number $n$ chosen will of course in general be as small as possible without endangering the reliability of the magnetic store in any way, consistent with the requirement that in apparatus in which the digit signals are fed out in uninterrupted succession from the high-speed store so that the entire contents of the store is fed out continuously again and again, according to our invention the value of $n$ will be chosen so that it is relatively prime to the total number of digit signals N to be transferred so that when the entire contents have been repeatedly fed out in this manner $n$ times and every $n$th digit signal has been selected as described, all the digit signals will have been selected once and once only.

According to another arrangement, $n$ or a factor of $n$ parallel channels may be provided between the high-speed store and the magnetic store, the digit signals being distributed cyclically between the channels so that the time of transfer is reduced by a factor equal to the number of channels.

The term "succession" as used hereinafter means that the totality of digit signals presented during the repeated presentation of a set of such signals is for the purpose under discussion to be considered as a continuous series of digit signals even though actually there may be a time interval between each two successive presentations of the set.

In order that the invention may be more clearly understood and so that further features may be explained the invention as applied by way of example to an electronic binary digital computer comprising a rapidly operating high-speed acoustic delay line store and a magnetic store will now be described. In this computer, binary digital numbers are represented dynamically by a train of regularly occurring digit signals, each digit signal being allocated a digit period of one microsecond duration, the presence of a pulse in a digit period representing the binary digit 1 and being referred to as a one in the following description, and the absence of a pulse in a digit period representing the binary digit 0 and being referred to as a nought in the following description. Digit signals are organized into groups called words consisting of 32 digit signals. The positions occupied by digit signals in a word are numbered in order from 1 to 32 so that, for example; the digit signal occupying the seventh position in a word is referred to as digit signal 7. These words may either represent a binary number involved in a computation or an instruction used to control a computation. Such a computer will comprise a number of delay lines for storing these words, apparatus for performing various computing operations on these words as directed by instruction words, and numerous inter-connections for enabling words to pass between these various devices. Details of operation of such a computer, explanations of various technical words or expressions used in the following description, and interpretations of signs and symbols used in the drawings, will be found in co-pending patent application Serial No. 202,615, now Patent No. 2,686,632, issued August 17, 1954.

The invention will be described with reference to the drawings filed with this specification in which:

Figures 11 to 15 show details of part of the circuit arrangements shown in Figures 8 and 10; while

It is, of course, understood that use of the terms "right hand" and "left hand" as applied to the valves of a multivibrator is purely for convenience and certainty of terminology and implies no constructional limitation whatsoever as to relative positions.

Figure 1:
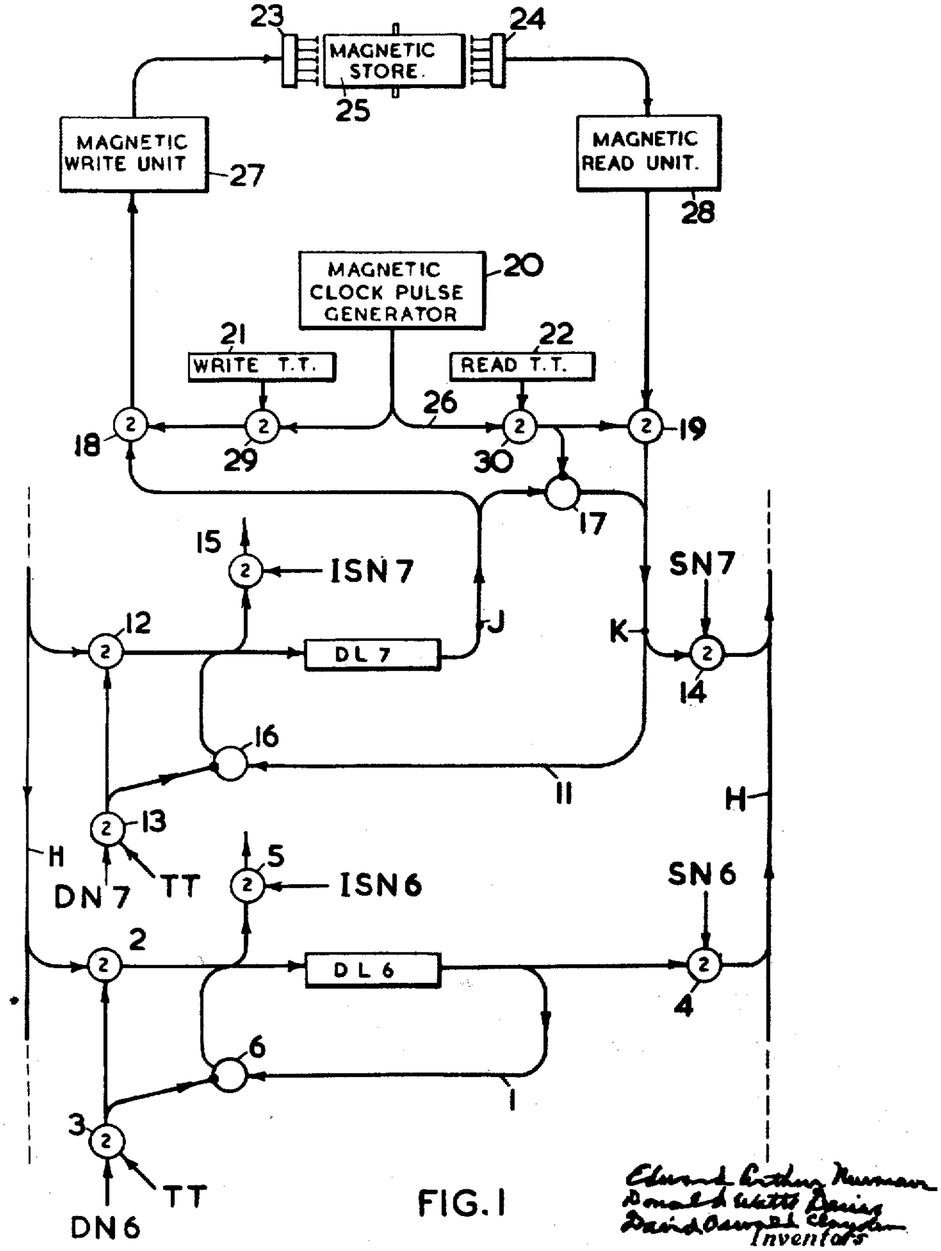
Figure 1 shows schematically part of a computer comprising delay line stores and a magnetic store.

Figure 1 shows two typical delay line stores DL6 and DL7, two of many such high-speed stores in a computer. The delay line DL6 is shown connected in a normal manner while the delay line DL7 is shown with its normal circuit connections and with additional connections between points J and K that enable words to be transferred to and from a magnetic store 25.

The delay line DL6 is connected in a simple circulating loop 1 and as the delay line imposes a delay of 1024 microseconds on digit signals circulating therethrough a total of 32 words, each word consisting of 32 digits, can be indefinitely passed round the loop 1. Thus the total number of digits N in the digital information stored in the delay line DL6 is 1024. A delay line which can store 32 words is called a long tank and the time taken for the contents to circulate once (1024 microseconds) is called a major cycle. The time taken for one word to emerge from a delay line (32 microseconds) is called a minor cycle. In order to facilitate description of the operation of the long tanks such as DL6 and DL7 the digit signals circulating therethrough will be numbered continuously in order from 1 to 1024.

The output of the delay line DL6 can be fed out through a source gate 4 onto a highway H when the signal SN6 is a continuous one. Thus if the signal SN6 is indefinitely a continuous one, the contents of the delay line DL6 can be repetitively presented to the highway H. The outputs of all the delay lines are connected to this highway H which is also connected to the various computing devices in the computer and the destination gates (such as 2 and 12 for the delay lines DL6 and DL7 respectively) of the various delay lines. It will be appreciated that some or all of the contents of a delay line store may be fed out onto the highway H without affecting the continued circulation of these contents round the conducting loop, but if digit signals are fed into a delay line store from the highway H, the digit signals circulating round the loop which had hitherto occupied the appropriate digit periods must be annulled. This is done by arranging in the case of the typical delay line DL6, that when a destination gate 2 is opened by ones received from a gate 3, an inhibition gate 6 in the conducting loop is also operated and breaks the loop. A one is received from the gate 3 when one is present in the signal DN6 calling for the destination gate of the delay line DL6 to be opened and when a one is present in the signal TT from a transfer timer calling for the selected destination gate to be open for a certain period.

To illustrate this control arrangement we will describe the procedure by which a chosen single word in the delay line DL6 is transferred to the delay line DL7. The source gate 4 is opened for a whole major cycle by the incidence of a continuous stream of ones from SN6, so that the contents of the delay line DL6 circulates round the highway H. A continuous stream of ones is also supplied from DN7 to a gate 13 but this gate is not opened until a one is received from TT. This one will be timed to occur when the first digit signal in the chosen single word is emerging from the delay line DL7. At this moment the gate 13 will produce a one and will open the destination gate 12 and close an inhibiting gate 16 which will erase the word in DL7 that is to be replaced by preventing the circulation thereof. A continuous stream of 32 ones lasting one minor cycle will be produced from TT so that the chosen word is fed into the delay line DL7 in place of the word eliminated by closing gate 16. At the end of this minor cycle the supply of ones from TT ceases and normal circulation through the delay line DL7 is resumed. Transfers of any part or the whole of the contents of a delay line store to any other delay line store may be effected in a similar manner.

Outputs to instruction gates 5 and 15 are gated by instruction source numbers ISN6 and ISN7 so that when ones are present in these numbers the digit signals circulating round the loops are fed out to an instruction highway from whence they are used to control computing operations taking place in the computer.

The delay line DL7, however, is provided with additional circuit connections between the points J and K in its circulating loop that enable words to be transferred between it and a magnetic store 25. Although in the computer at present being described only one delay line store is provided with this transfer facility it will be appreciated that more than one selected delay line store may be so provided. In any case however, words can be passed between any delay line store and the magnetic store through a selected store such as the delay line DL7.

The magnetic store 25 consists essentially of a rotatable wheel or drum, on the curved circumferential surface of which is a magnetizable layer on which magnetization patterns may be induced by associated writing heads. Each writing head is fixed in close proximity to the magnetizable layer so that when the wheel is rotated at a fixed speed and the writing head selected by a write tree 23 is energized by a train of regularly occurring signals, a succession of magnetization patterns are formed along a circumferential track around the wheel.

The delay line DL7 is a long tank storing 32 words or 1024 digit signals and 1024 discrete magnetization patterns are arranged to completely occupy one circumferential track so that the contents of the delay line can be transferred to one circumferential track through one writing head. The recording wheel would in this case be required to rotate at nearly 60,000 R. P. M., without any special arrangements according to our invention.

Figure 2:
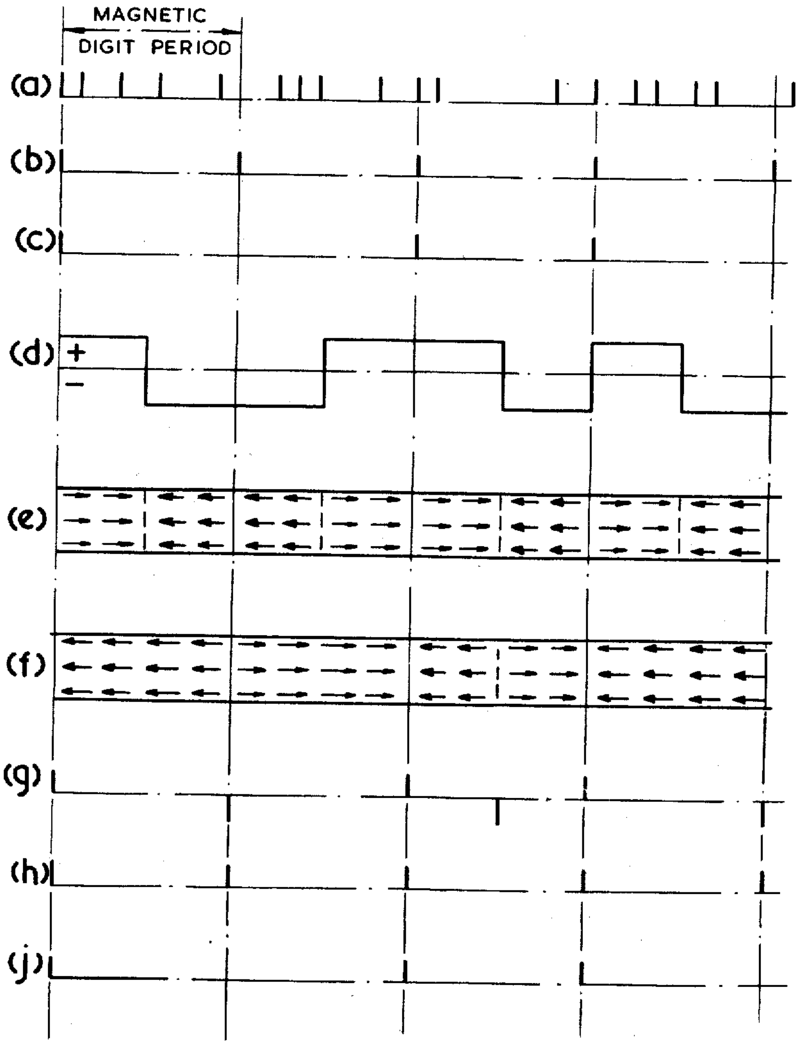
Figure 2 shows various waveforms explaining the operation of the circuits shown in Figure 1.

A method according to our invention of transferring the contents of the delay line DL7 to a particular track in the magnetic store 25 while the recording wheel rotates at less than 7,000 R. P. M. will now be described. Normally in the absence of an inhibiting signal on the gate 17 and an output from a gate 29 applied to the write gate 18, the contents of the delay line DL7 circulate round the loop 11 in a similar manner to the way the contents of the delay line DL6 circulate round the loop 1. Part of the contents of the delay line DL7 is shown in Figure 2(*a*). The magnetic clock pulse generator 20 produces a magnetic clock pulse, that is a correctly timed and formed pulse signal representing a one, during every ninth digit period as shown in Figure 2 (*b*). This output is fed continuously to the gate 29 which allows the magnetic clock pulses to be applied to the write gate 18 when the write transfer timer 21 is turned on. This trigger will be turned on when a transfer from the delay line DL7 to the magnetic store 25 is ordered and normally will be turned on for 9 major cycles.

When the write transfer timer 21 is turned on the output shown in Figure 2 (*c*) will be passed on to a magnetic write unit 27. As each digit period is of one microsecond duration and only one digit signal in nine is allowed through the gate 18 it will be seen that the time available for the recording of each of these selected digit signals is nine digit periods i. e. 9 microseconds, hereafter called a magnetic digit period. Suitable circuit arrangements for producing a current for energizing the particular writing head selected by the write tree 23 so that it induces distinct magnetization patterns will be fully described with reference to Figure 14 of the drawings. Such arrangement will produce a theoretical current waveform as shown in Figure 2 (*d*) from which it will be seen that each digit signal is characterized by the sense of the reversal of the direction of current flow which is produced at the middle of each magnetic digit period. The resulting magnetization pattern produced on the track is shown diagrammatically in Figure 2 (*e*), the direction of magnetization being shown by the arrows.

A reading head is also fixed in close proximity to each circumferential track so that as the various magnetization patterns as shown in Figure 2 (*f*) sweep pass on the rotating wheel, voltages are induced in the reading head. The general character of this voltage waveform will be as shown in Figure 2(*g*) from which it will be seen that the sense of the voltage change produced at each changeover in the orientation of the magnetization pattern is dependent upon the sense of that changeover.

An output is therefore obtained in a reading head at the mid-time of each magnetic digit period. The reading heads are however positioned in advance of the writing heads so that the magnetization patterns reach them half a magnetic digit period earlier as illustrated by Figures 2(*f*) and 2(*g*). The output of the reading head selected by a read tree 24, is passed to a magnetic read unit 28 where it is shaped and amplified and passed on to the gate 19. The gate 19 is also supplied with magnetic clock pulses from the magnetic clock pulse generator 20 as shown in Figure 2(*h*) when the read transfer timer 22 is on and supplies a continuous stream of ones to the gate 30. Only magnetic clock pulses which coincide with positive going voltage pulses as shown in Figure 2(*j*) pass through the gate 19 and so reach the circulating loop 11 of the delay line DL7. When magnetic clock pulses are applied to the gate 19 they are also applied to the gate 17 to stop the circulation of digit signals around the loop 11 in the temporal positions that are to be occupied by the digit signals emerging from the gate 19. It will be seen that as one digit signal emerges from the gate 19 during a magnetic digit period it will take 9 major cycles to transfer the contents of a track on the magnetic wheel to the delay line DL7.

The arrangement of the magnetization patterns representing digit signals, or magnetic digit signals as they will hereafter be referred to, and the manner in which they are laid down on and read off the periphery of the rotatable wheel will now be described with reference to Figure 3.

It has already been described how every ninth digit signal is selected for transfer from the delay line to the magnetic store until every digit signal has been thus transferred. Figure 3 shows a diagrammatic plan view of a magnetic storage wheel adapted to rotate in the direction indicated one revolution per nine major cycles, that is, at about 6,667 R. P. M. The wheel is divided into nine equal segments by the radial lines D1 to D9 and it will thus be clear that the wheel moves round through one of these segments during a major cycle, that is each time the contents of a long tank such as delay line DL7 are presented once. Now the magnetic digit signals are equally spaced around the periphery so that each signal occupies 1/1024 part of the periphery. It will be assumed that a writing head H1 is positioned on the line D1 as shown in Figure 3 and that the first digit signal is about to be written onto the wheel. As the wheel rotates in the anticlockwise direction indicated, the digit signal 1 will be laid down in the position shown in the magnified view of the positions occupied by the magnetic digit signals. The next digit signal 10 to be selected is laid down immediately next to digit signal 1 as shown. It will readily be seen that the order of the digit signals laid down will be 1, 10, 19, 28, 37 etc. The 114th magnetic digit signal to be laid down will be the $(113\times9+1)$ digit signal emerging from the delay line, that is, digit signal 1018. The 115th digit signal will be digit signal 3. As shown in the second enlarged view in Figure 3 the line D2, which marks the position on the wheel which is opposite the writing head H1 when signal 1 is emerging from the delay line store on the following occasion, lies 2/9 of the length occupied by a magnetic digit signal ahead of digit signal 3 on the circumferential track.

In a similar manner after a second presentation of the digit signals emerging from the delay line store, the first few digit signals in the next cycle to be transferred to the magnetic store are 5, 14, 23 etc. as shown in the third enlarged view. The first few digit signals in the remaining cycles are as shown in the remaining enlarged views shown in Figure 3.

In the arrangement for transferring digit signals to and from the magnetic store already described with reference to Figure 2 it was stated that due to the fact that the indication of the nature of the magnetic digit signal on the magnetic wheel is not available until half-way through the magnetic digit period (see Figures 2(*b*) and 2(*g*)) the reading head was advanced by half the distance occupied by a magnetic digit signal in the opposite direction to that of the wheel rotation (see Figures 2(*e*) and 2(*f*)) and this would ensure that digit signals would be read out of the magnetic store at any future time and passed into the delay store line in their appropriate temporal positions in the circulating order provided that the magnetic wheel was synchronized to rotate once during nine complete circulations of the contents of the delay line store. As the circumference of the magnetic wheel is of the order of 10 inches and approximately 1000 magnetic digit signals are laid down in that length, the above described arrangement requires the reading and writing heads to be 0.005 inch apart.

The task of mechanically constructing a writing and reading head pair spaced so close together is completely avoided by employing the following feature of our invention. Inspection of Figure 3 shows that when five complete major cycles have passed since the transfer of digit signal 1 began and the position line D6 is opposite the writing head H1 the digit signal 2 will be laid down after the elapse of one digit period. Therefore if a reading head H6 is provided on the position line D6 as shown digit signal 2 will be read out of the magnetic store in its appropriate period followed by digit signals 11, 20 etc. In view of the nature of the magnetic recordings the reading head would in fact be advanced by half the length of the track occupied by a magnetic digit signal.

In order that these digit signals may pass through the gate 19 in the arrangement shown in Figure 1 it is necessary to modify this arrangement by delaying the pulses applied to the gate 19 from the magnetic clock pulse generator 20 for one digit period by inserting a unit delay at the position 26 so that the clock pulses occur at digit periods 2, 11 etc.

It is equally possible for a reading head to be placed a distance equivalent to half a magnetic digit period in advance of any of the positions H2 to H9 provided an appropriate delay is inserted at position 26. These delays for positions H2 to H9 would be 2, 4, 6, 8, 1, 3, 5 and 7 digit periods respectively.

A writing or reading transfer by the circuit arrangements shown in Figure 1 occupies 9 major cycles. The transfer may commence at any time provided it goes on long enough. For example, in a writing transfer, the first digit signal to be transferred may be digit signal 451 followed by digit signals 460, 469 etc. and at the end of the transfer digit signal 442.

Figure 4:
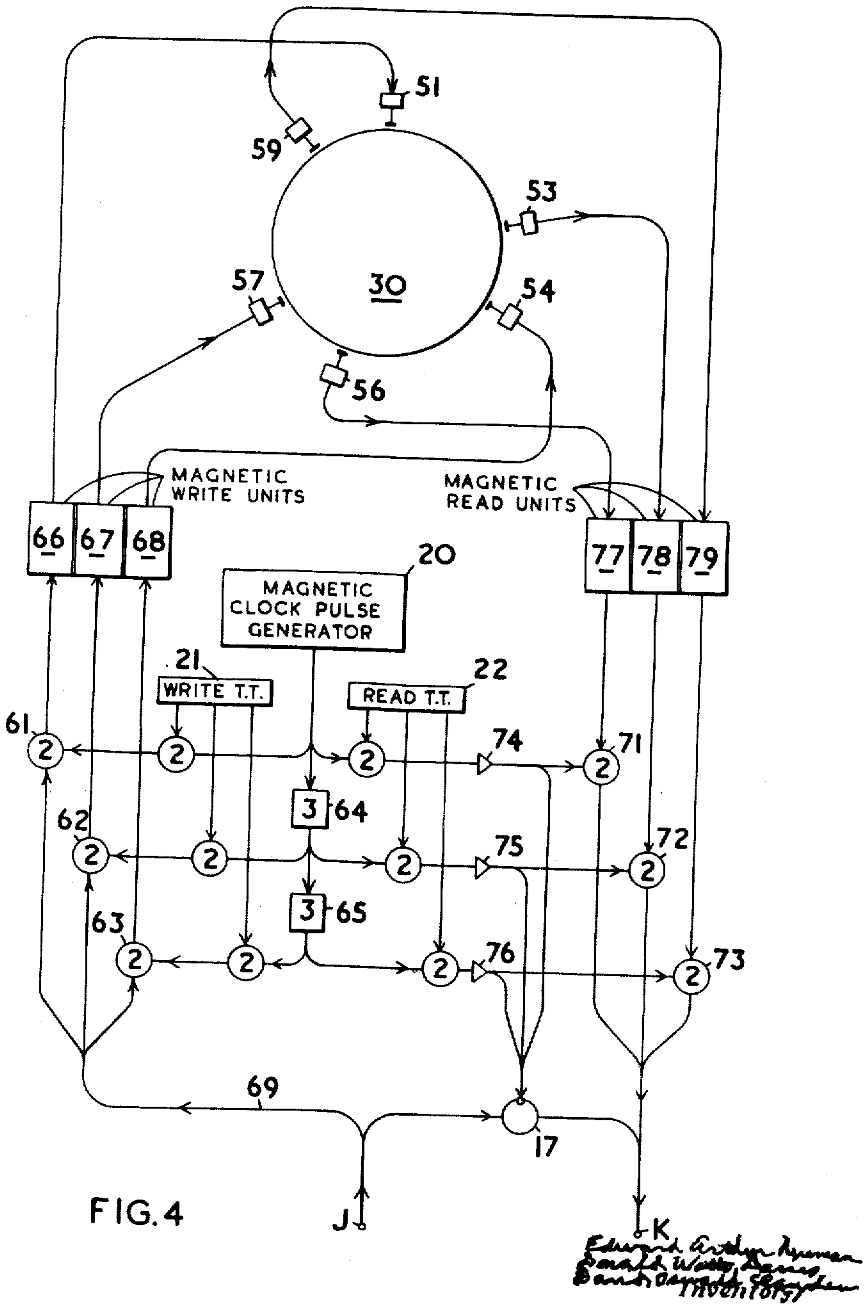
Figure 4 shows alternative circuit arrangements for transferring digit signals to and from the magnetic store.

Figure 4 shows circuit arrangements for transferring the contents of a long tank to or from a circumferential track on the rotating wheel 30 in three major cycles without requiring an increased speed of rotation of the wheel or requiring a shortened magnetic digit period. The increase in speed of transfer by a factor of three is achieved by triplicating the writing and reading circuits, and thereby providing three parallel operating channels to and from the magnetic store.

Figure 3:
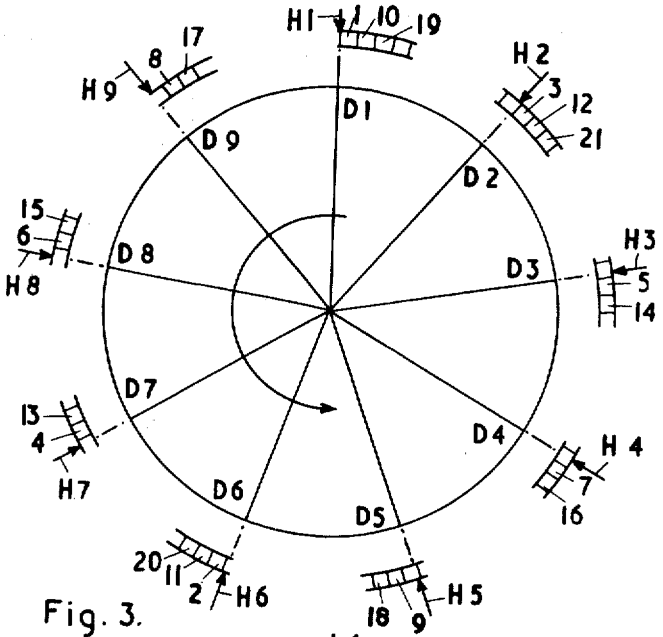
Figures 3 and 5 shows schematic views of rotatable wheels in a magnetic store.
Figure 6:
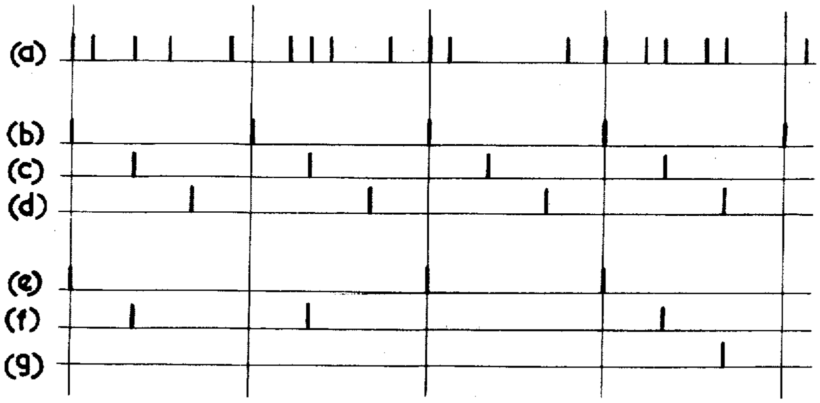
Figures 6 and 7 show waveforms explaining the operation of the apparatus shown in Figure 4 and of a modification respectively.

Three writing heads 51, 54 and 57 are provided around the rotating wheel 30 at the positions H1, H4 and H7 (as shown in Figure 3) and three reading heads 53, 56 and 59 are provided at the positions H3, H6 and H9. The three writing heads are supplied with the output from the point J in the conducting loop of the delay line through the magnetic write units 66, 67 and 68 when the gates 61, 62 and 63 are open. When the write transfer timer 21 is generating a continuous stream of ones the output of the magnetic clock pulse generator 20, shown in Figure 6(*b*), is applied to the gate 61, this output delayed by 3 digit periods by the three unit delay 64 as shown in Figure 6(*c*) is applied to the gate 62, while this delayed output further delayed by 3 digit periods by the second three unit delay 65 as shown in Figure 6(*d*) is applied to the gate 63. Figures 6(*e*), 6(*f*) and 6(*g*) therefore show the trains of digit signals applied to the magnetic write units 66, 67 and 68 respectively when the digit signals emerging from the point J are as shown in Figure 6(*a*). By this arrangement magnetic digit signals are laid down by the writing head 51 on the periphery of the rotating wheel 30 between the lines D1 and D4 while the magnetic digit signals are laid down by the writing head 54 and 57 on the periphery between the lines D4 and D7 and between D7 and D1 respectively. At the end of three major cycles 1024 magnetic digit signals have been laid down on the circumferential track in the same order as they would have been in nine major cycles by one writing head operated by the circuit arrangements shown in Figure 1.

In a similar manner the contents of one circumferential track can be read out of the magnetic store in three consecutive major cycles by the triplicated reading circuit arrangements shown in Figure 4. The outputs of the reading heads 56, 53 and 59 are fed through the magnetic read units 77, 78 and 79 respectively to the read gates 71, 72 and 73 respectively. When the read transfer timer 22 is on and is generating a continuous stream of ones the three versions of magnetic clock pulse trains shown in Figures 6(*b*), 6(*c*) and 6(*d*) each delayed by one digit period by the unit delays 74, 75 and 76 respectively are applied to the gates 71, 72 and 73 respectively. These additional delays of one digit period in each case are required as by examination of Figure 3 it will be seen that the reading head 53 is reading digit signal 5 when its corresponding writing head 57 is writing digit signal 4, and reading heads 56 and 59 are reading digit signals 2 and 8 respectively while their corresponding writing heads 51 and 54 are writing digit signals 1 and 7 respectively.

The two magnetic transfer arrangements shown in Figures 1 and 4 have permitted a digit signal to be written onto or read off the magnetic wheel in nine digit periods. It has been pointed out that in the computer being described in which cyclically available sets of 1024 digit signals are required to be transferred this speed reduction factor may be any number *n* such as nine which is relatively prime to 1024 in order to enable 1024 digit signals to be transferred during *n* consecutive presentations of the digit signals. In the case of a set of 1024 digit signals, *n* may be any odd number.

Figure 5:
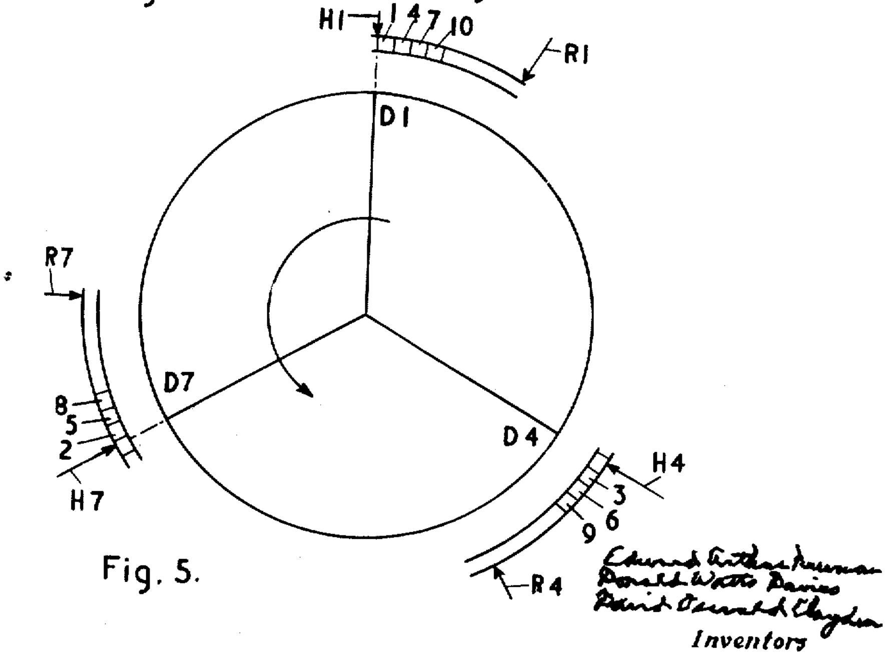
Figure 7:
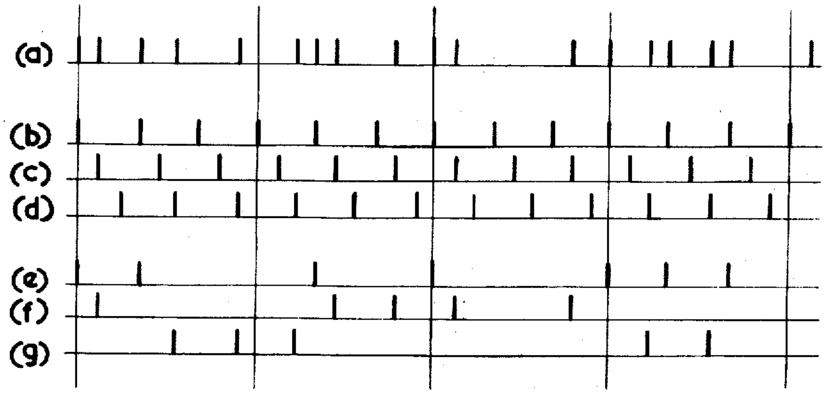

If the permissible speed of operation of the magnetic store could be increased and/or the digit period in a high-speed store that it is associated with in a computer was not as short as one microsecond, it would be possible to use a smaller speed reduction factor *n*, for example three. The arrangement of the magnetic digit signals around the magnetic wheel would then be as shown in Figure 5. The wheel would complete one revolution in three major cycles during which time 1024 digit signals would be transferred by one writing head positioned at say H1. Employing the circuit arrangements shown in Figure 1 the train of digit signals shown in Figure 7(*a*) emerging from the point J are gated at the gate 18 (when the write transfer timer 21 is on) by a train of magnetic clock pulses from the magnetic clock pulse generator consisting of every third clock pulse as shown in Figure 7(*b*). The resulting train of digit signals applied to the magnetic write unit 27 is shown in Figure 7(*e*). A single read head placed at the position H7 or H4 shown in Figure 5 and supplying the reading circuits shown in Figure 1 incorporating at the point 26 a delay of one or two digit periods respectively, could be used to read the contents of a circumferential track in three consecutive major cycles.

By using three writing heads positioned at H1, H4 and H7 as shown in Figure 5 and three parallel channels to and from the magnetic store similar to those shown in Figure 4, the contents of a delay line store can be transferred to the rotating wheel during one major cycle. The changes in the writing circuits shown in Figure 4 are as follows. The magnetic clock pulse generator 20 is designed to generate a train of pulses comprising every third clock pulse as shown in Figure 7(*b*). The 3 digit period delay units 64 and 65 are replaced by single unit delay units so that the pulse trains applied to the gates 62 and 63 are as shown in Figures 7(*c*) and 7(*d*) respectively. If the output from point J is the pulse train shown in Figure 7(*a*) the outputs of the gates 61, 62 and 63 are the pulse trains shown in Figures 7(*e*), 7(*f*) and 7(*g*) respectively. The whole of the contents of the long tank delay line store can thus be transferred to the rotating wheel in a third of a revolution so that the speed of operation of the magnetic store is equal to the speed of operation of the high-speed delay line stores. With this arrangement however there are no vacant positions to place three reading heads. To avoid placing the reading heads only half of a magnetic digit period in advance of the writing heads, a delay may be inserted at the position 69 shown in Figure 4. The reading heads may then be placed at the positions R1, R4 and R7 shown in Figure 5 which are at distances in advance of the writing heads equivalent to this delay at the position 69 less half a magnetic digit period. The delay inserted at the position 69 is sufficient to enable the reading heads and writing heads to be spaced far enough part so as not to interfere with each other. The delay may conveniently be provided by a suitable acoustic delay line.

Whereas, when only one channel is provided to or from the magnetic recording wheel and every *n*th digit is selected, *n* must be an integer prime to N, the total number of serially available digits to be transferred, when more than one channel is provided *n* is not necessarily so limited. For example, if N is again 1024, *n* may be 6 if 2 channels are provided. In this case the first channel transfers every third odd numbered digit in three cycles thus:

[1, 7, 13 . . .,] [3, 9, . . .,] [5, 11, . . .]

while the second channel transfers every third even numbered digit for three cycles thus:

[4, 10, 16 . . .,] [6, 12, . . .,] [2, 8, 14 . . .]

Although after three cycles each channel would commence if permitted to transfer the same digits as it has been during the first three cycles, this does not matter as the transfer lasts for only three cycles, and it will be seen that it is thus necessary for 3 (and not 6) to be relatively prime to 1024. Generally, if *m* channels are provided where *m* may be unity, $n/m$ must be relatively prime to N. Of course in all reasonably practical cases *m* will be a factor of *n*.

Various circuit arrangements which provide paths for digit signals to and from a magnetic store have now been described. Details of operation of the write and read transfer timers which control the time when these transfers take place and details of operation of the write and read trees which select the track on the rotating wheel to or from which a transfer is to be made have not so far been given. It is now proposed to describe with reference to Figure 8 the circuit arrangements for controlling the time of transfers and for choosing which track to and from which these transfers are to take place. These circuit arrangements control transfers which take place substantially as already described with reference to Figure 1 including a unit delay at point 26. The magnetic store will be described as consisting of a rotating wheel on the magnetized periphery layer of which magnetized digit signals are laid down in 64 collateral tracks. These tracks are laid down by a writing head assembly and read off by a reading head assembly positioned ⅘ of the circumference away from the writing head assembly (i. e. the assemblies are at positions H1 and H6 as shown in Figure 3). Each assembly will be described as consisting of eight heads, each of which can lay down eight tracks as the whole assembly is movable in eight steps across the outer curved surface of the rotating wheel, each step being ⅛ of the distance between adjacent heads in the assembly so that 64 tracks can be provided.

A magnetic transfer takes place when a word, hereafter called a magnetic instruction word, is sent to destination DN20, an ordinary destination in the computer like destinations DN6 and DN7 which admit words to the delay lines DL6 and DL7 respectively. A continuous stream of ones being applied to a gate 81 shown on the left of Figure 8, the magnetic instruction word appearing on the highway H passes through a gate 82 and the various digit signals therein pass through the gates opened by the various P pulses P1, P2 etc.

The function of the various digit signals in the magnetic instruction word are as follows:

1. If a one clear write staticisors and prepare to write
2. If a one clear read staticisors and prepare to read
3.–5. Set up write electronic tree to select write head required.
6.–8. Set up write mechanical tree to select position of writing head assembly required.
9. Spare.
10.–12. Set up read electronic tree to select read head required.
13.–15. Set up read mechanical tree to select position of read head assembly required.
16. Spare.
17. If a one write (as soon as possible).
18. If a one read (as soon as possible).
19–32. Spare.

It will be seen that one digit signal (1) is used to prepare for a write transfer and another (17) to actually commence it and similarly for a read transfer. It is thus possible to merely prepare for a write or read transfer without ordering either of them to take place. The reason for providing this facility is as follows. It will be supposed that a lengthy computation is taking place in the computer and a number of used words or used instructions are periodically assembled in the delay line DL7 for transfer to the magnetic store. The first collection will be transferred to track 1 say, and the second to track 2 and so on. The first eight collections can in this way be transferred to the first eight tracks without the writing head assembly moving its position. These track changes can take place as quickly as required as they are carried out by the electronic tree feeding the writing heads. It is now known to the programmer, who is directing the operation of the machine, that the next collection must be transferred to track 9 and this track change will involve a change in the position of the writing head assembly by one step so that its array of writing heads are in line with tracks 9 to 16 instead of tracks 1 to 8. The mechanism by which this change in the position of the writing head assembly is carried out is fully described in copending British patent application No. 20,371/50, now British Patent No. 682,998, from which it will be seen that the time which must be allowed for the assembly to be moved from one position to another is of the order of 100 milliseconds. This is a considerable time in view of the high speed of operation of the computer (100 major cycles) so that it is highly desirable that the mechanical movement of the writing head assembly is started as soon as it is no longer required to be stationed in its initial position and the start nut delayed until the contents of the delay line DL7 are assembled ready for transfer. Thus in the above example, the programmer can insert a preparatory instruction to be obeyed immediately after the eighth collection has been transferred to track 8 which orders the writing head assembly to move to its next position and select track 9 but not carry out a write transfer. The computation will then carry on until the ninth collection is assembled in the delay line DL7. The digit signals in the next instruction word which orders the transfer of this collection to track 9 will be the same as those in the said preparatory instruction word except that digit signal 17 will be a one instead of a nought.

If digit signal 1 is a one the six write staticisors S3 to S8 will react so that they will be set in accordance with the nature of the digits signals 3 to 8. The first three staticisors S3, S4 and S5 set up the write electronic tree 83 to supply a continuous stream of ones to a selected one of the eight gates T1 to T8. The output of the second three staticisors S6, S7 and S8 set up the write mechanical tree 84 which controls the position of the writing head assembly. If a change is required in the position of this assembly there will be a change in the setting of one of the staticisors S6, S7 or S8 and this change is detected by feeding the output of each of these staticisors directly and also through a delay of approximately 32 digit periods to not-equivalent circuits E6, E7 and E8 respectively so that a continuous output will appear on the common output line 85 if a change in the position of the writing head is taking place. Unless the previous setting of the staticisors S6, S7 and S8 was 000 i. e. all three staticisor triggers were reset, the resetting of the triggers by digit signal 1 will produce an output on the line 85 irrespective of whether the new setting is to be different or not. The output on line 85 is therefor applied to a trigger 86 through a gate G16 to which is applied a P16 pulse from the pulse generator of the computer so that the trigger 86 is turned on only if an output is present during digit period 16. Any P pulse subsequent to P8 and prior to P17 could be applied to the gate G16, that is, any P pulse occurring after the positioning of the writing head has been ordered and before the order to write is given. The output of the trigger 86 is applied to the inhibiting gate G20 whose function will be described later and is also applied to the long delay circuit 87 which may be a one shot multivibrator timed to be reset and so reset the trigger 86 after about 100 milliseconds. This is an adequate time for the writing head assembly to move from any one position to another so that while the writing head assembly is moving from one position to another an inhibiting output is supplied to the gate G20.

If digit signal 17 is a nought the writing circuits are not further operated and the write electronic tree 83 and the write mechanical tree 84 are set up to select a writing track in accordance with digit signals 3 to 8. If the digit signal 17 is a one the write transfer timer 21 is turned on via the gate controlled by P17 pulses. If an inhibiting output is not applied to the gate G20, the output of the write transfer timer 21 is applied to the eight gates W1 and W8 and permits any output from the gates T1 to T8 to be applied to the appropriate writing head WH1 to WH8. If an inhibiting output is applied to the gate G20 then the output of the write transfer timer 21 is similarly applied when this inhibiting output is terminated.

Figure 8A:
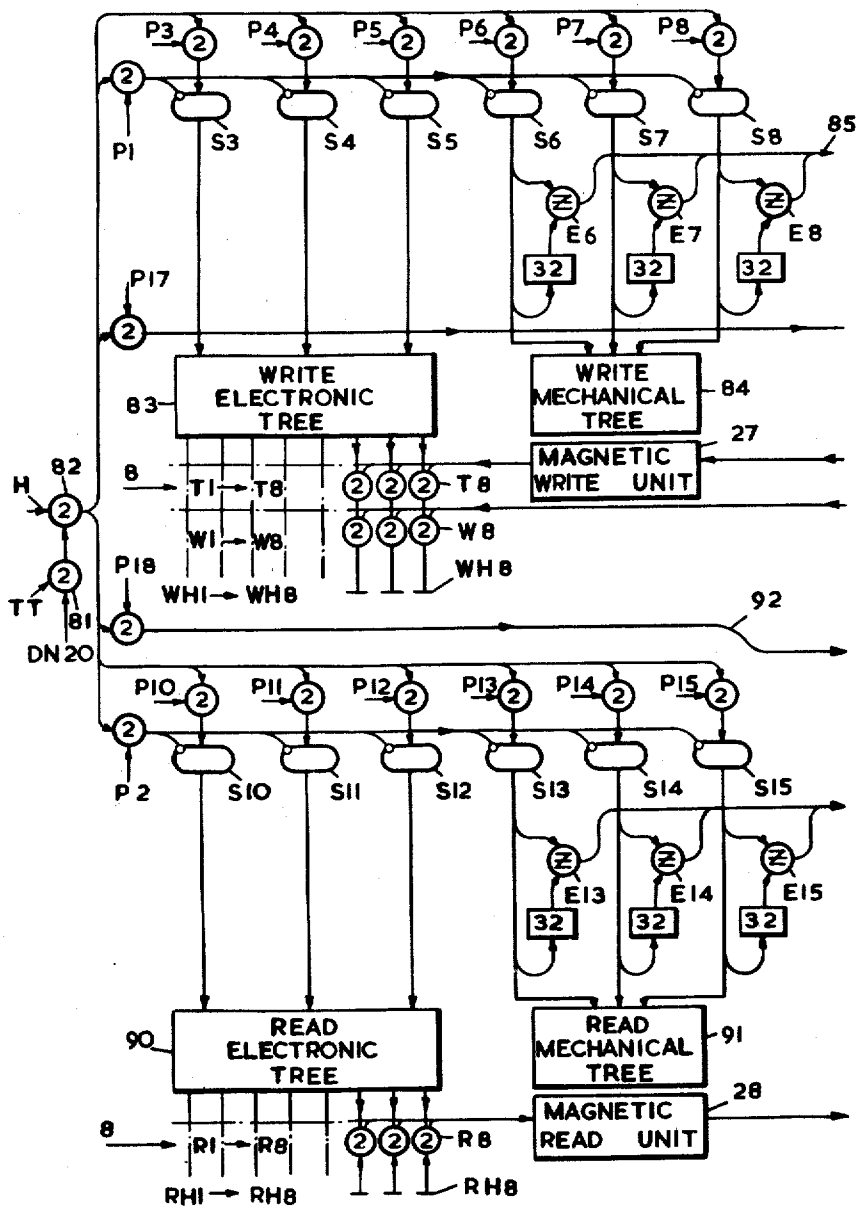
Figures 8 and 10 show two alternative circuit arrangements for controlling transfers to and from the magnetic store.

Part of the circulating loop of the delay line DL7 between joints J and K is shown in Figure 8 and the output of the delay line DL7 appearing at point J is applied to the gate 18 at which it is gated by the magnetic clock pulse generator 20 and applied to the magnetic write unit 27 in a manner already described in connection with Figure 1. The output of the magnetic write unit 27 is applied to all eight gates T1 to T8 and passing through the gate selected by the electronic tree 83 and the corresponding one of the gates W1 to W8 is applied to the corresponding one of the write heads WH1 to WH8.

It will be observed that in Figure 1 the write transfer timer 21 was shown gating the output of the magnetic clock pulse generator 20 so that when a write transfer was not taking place the magnetic write unit 27 was inoperative. This was done for simplicity but due to the fact that large currents must be built up in a very short time to energize the write heads the arrangement shown in Figure 8 by which the magnetic write unit is continuously operated is preferable in spite of the fact that more gates are required.

When the output of the write transfer timer 21 is passed by the gate G20 and the gates W1 to W8 are opened, the write transfer commences when the next magnetic clock pulse opens the gate 18. The transfer timer 21 must now be kept on for at least $9 \times 1024$ digit periods i. e. 1024 magnetic digit periods and then turned off. The output from the gate G20 is therefore applied to a gate G21 which thereupon passes the next pulse from a gate G22.

The gate G22 is supplied with magnetic clock pulses from the generator 20 and with P32 pulses so that an output pulse is delivered to the gate G21 once in 32 magnetic digit periods. These pulses are applied to a counting unit 88 which is arranged to produce an output which resets the write transfer timer 21 on the receipt of the 33rd pulse from the gate G22. The counting unit 88 may comprise five trigger circuits in cascade which produce an output on the receipt of the 32nd input pulse. This output is then delayed by any simple delay circuit which imposes a delay of at least 32 magnetic digit periods.

The write transfer timer 21 is thus reset at least 1024 magnetic digit periods after a magnetic transfer has commenced and thereupon the write gates W1 to W8 will be closed and the transfer terminated.

The read transfer control circuits are very similar to the write transfer control circuits just described so that an actual read transfer operation will now be described in order to illustrate the action of these circuits. It will be assumed that at the time the magnetic instruction word is received by the gate 82 no write transfer is taking place and that the selected read head is reading from track 5. It will also be assumed that the incoming instruction word directs that the contents of track 10 are to be transferred to the delay line DL7 as soon as possible. The first 18 digits of the 32 digit instruction word will therefore be 010000000010100001. Digit signal 2 being a one causes the six read staticisors S10 to S15 to be reset. The digit signals 3 to 8 must be noughts otherwise they would affect the write staticisors S3 to S8. The digits signals 10, 11 and 12 being 010 will cause the read electronic tree 90 to open the third read gate R3 out of the eight read gates R1 to R8 so that the output of the read head RH3 is supplied to the magnetic read unit 28. The digit signals 13, 14 and 15 being 100 will cause the read mechanical tree 91 to move the read head assembly to its second position. The assembly was in its first position as the track 5 had been previously selected so about 32 microseconds ago the staticisors S13, S14 and S15 read 000. There will thus be an output from the not-equivalent circuit E13. This output is applied to the read delay trigger 93 when gated by a P17 pulse at gate G17 which closes the gate G23 for approximately 100 milliseconds until the trigger 93 is reset by the output of the 100 milliseconds delay 94.

Meanwhile digit signal 18 being a one caused the read transfer timer 22 to be put on via the lead 92 but its output has hitherto been blocked by the gate G23. This gate now being opened the output of the read transfer timer 22 is applied to the gate G21 and the gate 30. The opening of gate 30 permits the magnetic clock pulses from the magnetic clock pulse generator 20 delayed by one digit period by the unit delay 95 to open the read gate 19 and block the circulating loop of the delay line DL7 by closing the inhibiting gate 17. The output of the selected read head RH1 to RH8, shaped and amplified by the magnetic read unit 28 is now fed into the circulating loop at the point K. The opening of the gate G21 permits the output of the gate G22 to be applied to the counting circuit 88 so an output is delivered from the circuit 88 1024 magnetic digit periods after the first pulse passes through the gates G21 and 30, which passing through an inhibiting gate G24, turns off the read transfer timer 22. The gates G21 and 30 are thereupon closed and the read transfer terminated and the normal circulation of the contents of the delay line DL7 resumed.

The operation of the control circuits when either a write transfer or a read transfer is ordered has now been described and it only remains to describe their operation when the magnetic instruction word orders both a write and a read transfer to take place as soon as possible, that is digit signals 1, 2, 17 and 18 are all ones. During digit periods 3 to 15 the write and read staticisors are set up and during digit period 17 the write transfer timer 21 is turned on, an output from which closes an inhibiting gate G25 which blocks the output path of the read transfer timer to the gate 30. Thus, when during the next digit period 18 the read transfer timer 22 is turned on, its output is blocked and will remain blocked until the write transfer timer 21 is turned off. The short delay 96 is inserted to assure that the gate G24 remains closed until the output from the count circuit 88 which turns off the write transfer timer 21 has terminated so that there is no danger of the read transfer timer 22 being spuriously turned off at this stage. The write transfer having now terminated the gate G25 is opened and the read transfer can commence immediately if the gate G23 is open, or as soon as it does open if a change in the position of the read heads assembly had been ordered. The read transfer carries on as previously described until the next output from the count circuit 88 puts the read transfer timer 22 off. It will be appreciated that a write transfer must precede a read transfer (unless the contents of one track are being transferred to another track on the rotating wheel) as otherwise the digit signals transferred from the magnetic store to the delay line store would be written over the digit signals assembled in the delay line store for transfer to the magnetic store.

Figures 8B, 9:
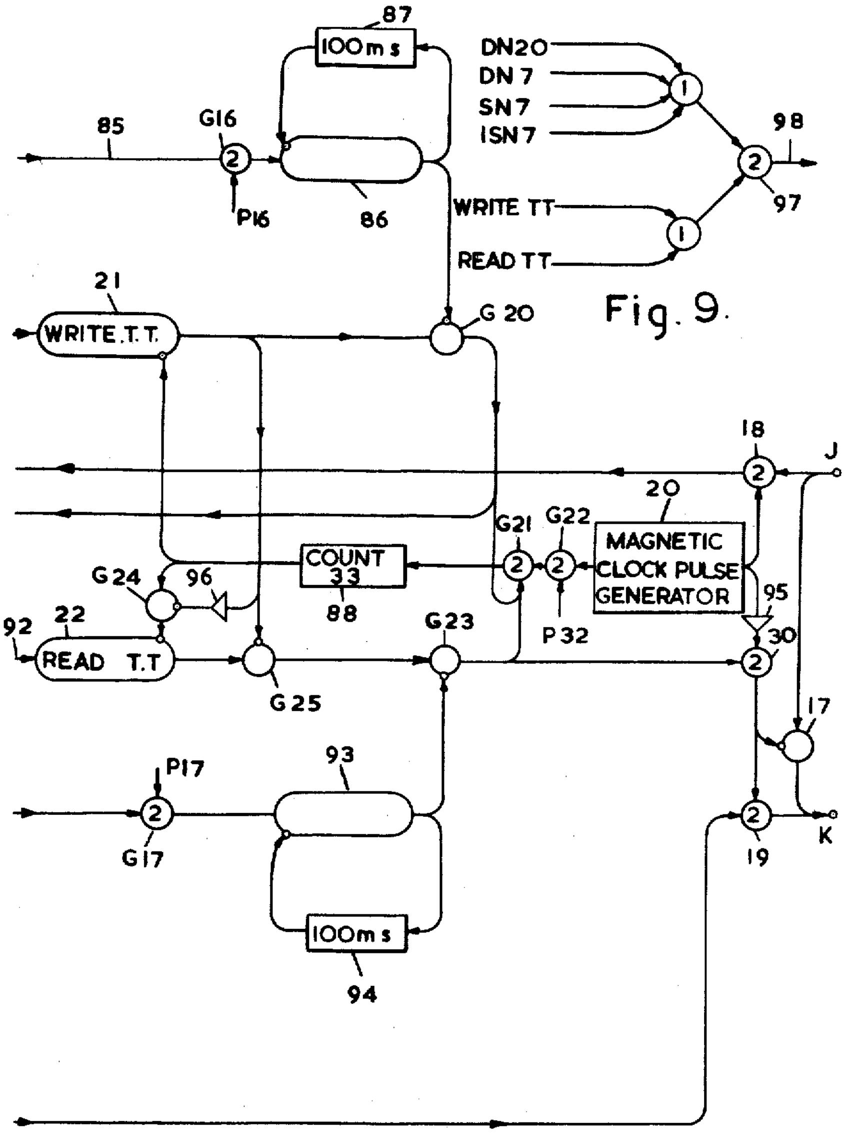
Figure 9 shows a schematic arrangement providing safety precautions during such transfers.

Figure 9 shows schematically circuit arrangements for assuring that a magnetic transfer once ordered is not disturbed by a subsequent instruction. It will be appreciated that such circuit arrangements are desirable as a magnetic transfer lasts for at least nine major cycles and may last as long as 100 milliseconds. As shown in Figure 9 the gate 97 is supplied with a continous input if either a write or read transfer is taking place or is about to take place. If at the same time one of the inputs DN20, DN7, SN7, ISN7 is a one the gate 97 produces an output 98 which is used to stop the computer and/or illuminate a warning light or sound a warning buzzer. If DN20 is on it means that a fresh magnetic instruction word has been ordered to the magnetic control circuit and the acceptance of such a word would jeopardise the write and read statiscisor settings, while if DN7 is on new words may be admitted to the delay line DL7 and written over the contents. The magnetic transfer would be upset in both these cases while if either ISN7 or SN7 is on and so either the instruction source gate 15 or the source gate 14 of the delay line DL7 is opened (see Figure 1), the output from either of these gates would be a confusion of the original and displacing contents of delay line DL7 if a read transfer were in progress.

Figure 10A:
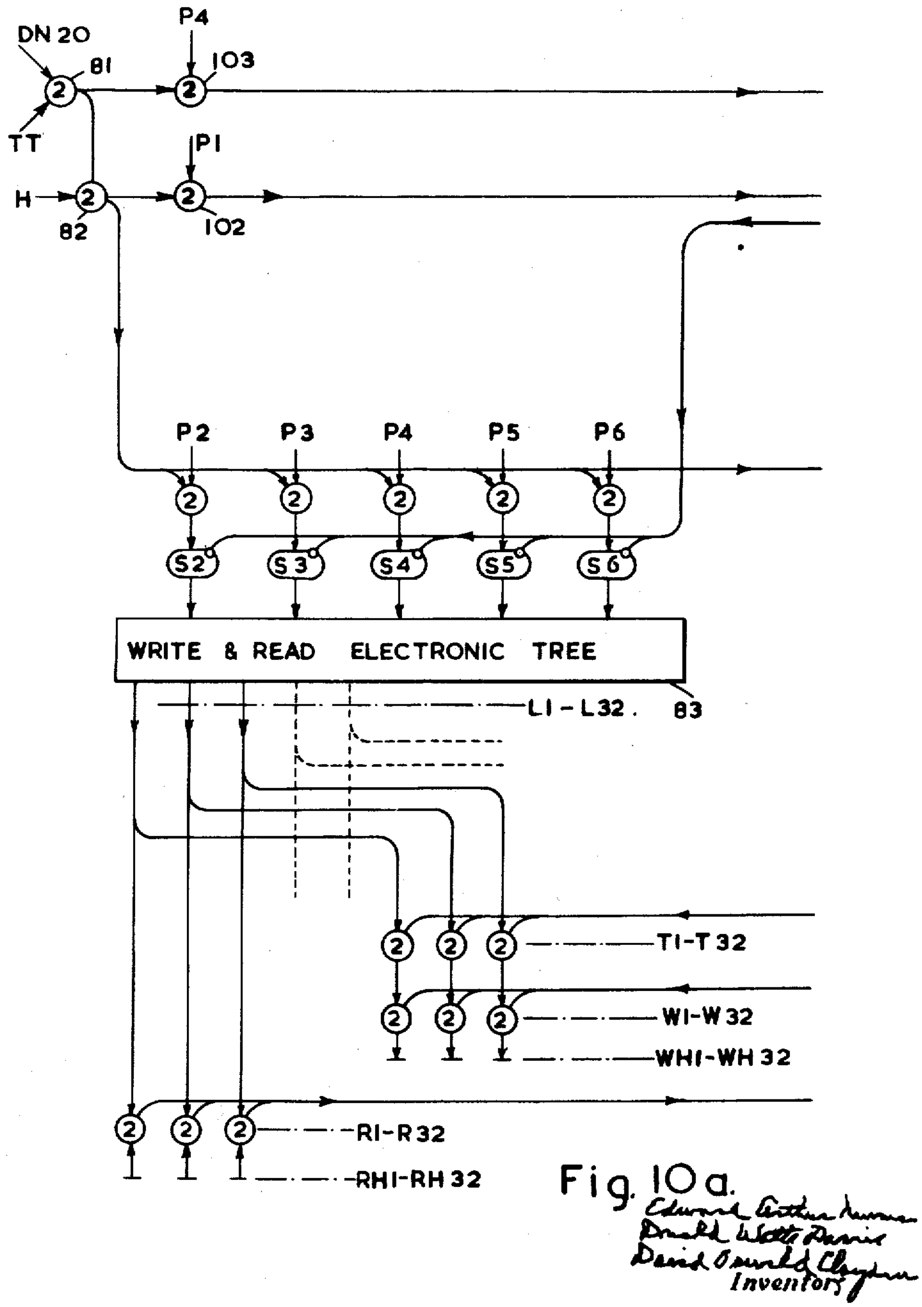
Figure 10B:
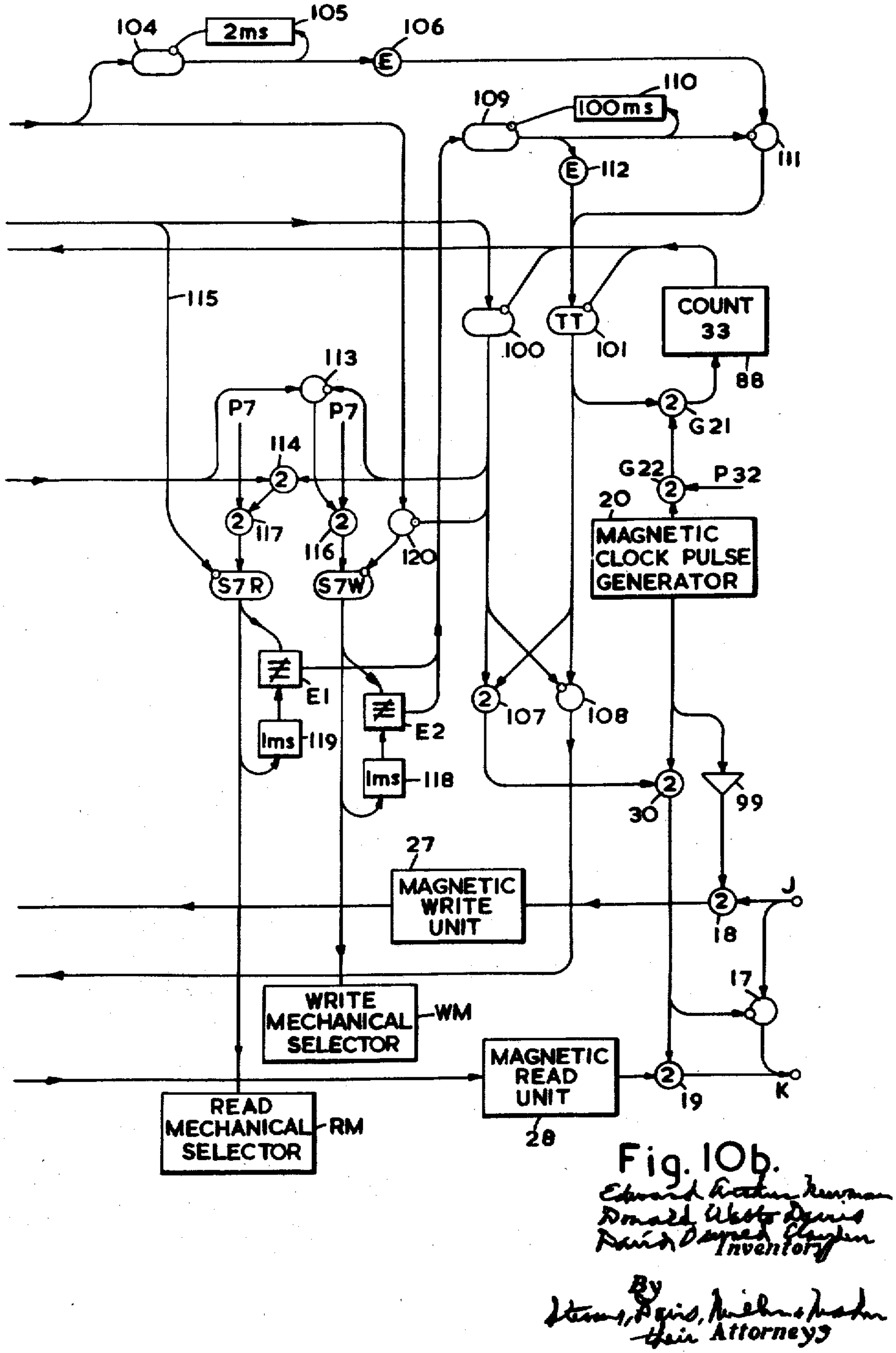

An alternative set of control circuits for directing a transfer to and from the magnetic store will now be described with reference to Figure 10. This set of control circuits differs from the set shown in Figure 8 chiefly in that the 64 collateral tracks on the magnetic drum are laid down by an array of 32 write heads which can be placed in either of two positions, while similarly information is read from the drums by an array of 32 read heads which can be placed in either of two positions, the write and read electronic trees are combined, and, as a mechanical change in the position of the heads will only take place after 32 tracks have been written on or read off, the circuit arrangements for pre-ordering a mechanical change in the position of the array of heads have been dispensed with. These control circuits are therefore somewhat simpler than those shown in Figure 8. Circuit elements in Figure 10 which correspond to circuit elements in Figure 8 are referred to by similar reference numerals, and, unless otherwise stated, may be assumed to function in a similar manner. Figure 10 shows the control circuits and the magnetic writing and reading circuits between the writing and reading heads and points J and K in the circulating loop of the delay line store DL7 as shown in Figure 1.

In this arrangement the magnetic store will be described as consisting of a rotating wheel having a magnetized periphery on which magnetized digit signals are laid down in 64 collateral tracks by a writing head assembly at a position on the periphery of the wheel corresponding to H6 as shown in Figure 3, while a reading head assembly reads the magnetized digit signals ⅛ of the circumference away from the writing head assembly at position H1 as shown in Figure 3. The positions of the writing head and reading head assemblies are therefore the reverse of the positions of the assemblies in the arrangement shown in Figure 8 and therefore the output of the magnetic clock pulse generator 20 is applied directly to the gate 30 and through a one microsecond delay 99 to the write gate 18 so that the digit signals are written into the magnetic store and delay line store DL7 in their correct positions. The reason for this reversal in the arrangement of the write head and read head assemblies will be given in the description of the apparatus shown in Figures 11 to 15.

A magnetic transfer takes place through the circuits shown in Figure 10 when a magnetic instruction word, sent along highway H, is allowed to pass through gate 82. This occurs at the appropriate time when the gate 81 produces a continuous output due to the transfer timer TT and destination DN20 producing outputs.

The function of the various digits in the 32-digit magnetic instruction word is as follows:

1. If a one, prepare to read, and inhibit the operation of the write mechanical selector.
   If a nought, prepare to write, and inhibit the operation of the read mechanical selector.

2.–6. Set up the write and read electronic tree to select the write or read head required.

7. Set, in accordance with digit 1, either the write or read mechanical selector to select the mechanical position of the write or read head assembly.

8–32. Spare.

The operation of the circuits will now be illustrated by the following descriptions of the operation of the circuits on receipt of various typical magnetic instruction words. The first of these words will most conveniently be one ordering a writing transfer which does not involve a change in the position of the write head assembly, and it will be assumed that the first seven digit signals are 0101101 and that the digit signal 7 in the previous magnetic instruction word obeyed was a one. It will also be assumed, that due to circuit arrangements which will be described later, the triggers 100 and 101, and S2 to S6 are off at this time.

As digit signal 1 is a nought no output will result from gate 102 and hence trigger 100, which staticises the order read or write for the duration of the pending transfer, will remain off.

The digit signals 2 to 6 inclusive set up staticisors S2 to S6 respectively, which in turn, set up the write and read electronic tree 83. As a result an output appears on one and only one of the 32 lines L1 to L32, which, which in the present case will be line L13 as the input signal to the tree 83 reads 10110.

Each of the lines L1 to L32 is connected to a corresponding write gate T1 to T32 and also to corresponding read gate R1 to R32, so that the output from the magnetic write unit 27 is applied through the corresponding one of the gates W1 to W32 (when these gates are on) to the corresponding one of the write heads WH1 to WH32; and the output of the corresponding one of the read heads RH1 to RH32 is applied to the magnetic read unit 28. In the present case the output from read head RH13 will be applied to the magnetic read unit 28 and the output of the magnetic write unit 27 will be applied to write head WH13 when the gate W13 is open.

The output of the magnetic read unit 28 can be fed into the circulating loop of the delay line store DL7 only when the gate 19 is open and the gate 17 is closed and similarly the contents of the delay line store DL7 can be fed to one of the write heads WH1 to WH32 is only when the appropriate one of the gates W1 to W32 is open and the gate 18 is open. The manner in which these gates are controlled so that they are opened at the required times will now be described.

At the same time as the gate 82 is opened by an output from the gate 81, a gate 103 will be prepared to produce during the application of the next P4 pulse, an output which puts on a trigger 104. This trigger will remain on for two milliseconds until it is reset by the output of a delay unit 105. The resetting of the trigger 104 causes an end element 106 to produce an output which is applied to a gate 111, which, assuming there is no output applied to its inhibiting connection, allows this output to pass on to a transfer-timer trigger 101 and turn it on. As a write transfer is being ordered and digit signal 1 in the magnetic instruction word is 0, the trigger 100 is off and hence no pulse signal is passed from this trigger to either of the gates 107 and 108. Thus any output from the transfer-timer 101 cannot pass through the gate 107 but is able to pass through the gate 108 to the gates W1 to W32 so that during the time that the transfer-timer is on the output of the magnetic write unit 27 is applied to the selected write head WH13.

From the foregoing description it will be appreciated that provided that gate 111 is open, a write transfer can commence a little more than two milliseconds after the opening of the input gate 82. It will also be appreciated that the tree 83 will be set up and producing a steady output on the selected output line L13 well within twenty microseconds after the opening of the gate 82, and hence about two milliseconds are allowed for the output from the magnetic write unit 27 to be switched to the gate W13. This switching may be satisfactorily carried out within two milliseconds by electromagnetic relays, such as Carpenter relays, so that by this arrangement for the addition of about two milliseconds to the magnetic transfer time of about nine milliseconds, 32 heavy current switching valves are dispensed with.

As previously described, the magnetic clock pulse generator 20 produces a stream of magnetic clock pulses which are applied to the gate 18 through the unit digit period delay 99 so that during the time that the transfer-timer 101 is on, every ninth digit signal passing the point J in the circulating loop of the delay line DL7 is applied to the magnetic write unit 27 and converted into a suitable current to energise the write head WH13.

As previously described in connection with Figure 8, magnetic clock pulses are also applied through the gate G22 fed with P32 pulses to the gate G21 to which the output from the transfer-timer is applied. The output from the gate G21 is applied to a counting unit 88 which produces an output after the receipt of 33 pulses from the gate G21. The output from the unit 88 resets the transfer-timer 101 which is therefore reset 32×32 magnetic digit periods after it was put on. Thus 1024 digit signals, that is, the entire contents of the delay line store DL7, will be transferred to the recording drum through write head WH13 during this time, and, as the gates W1 to W32 will now be closed, the writing transfer will be terminated.

The output from the count unit 88 is also used to reset the trigger 100 so that it is ready to be set in accordance with the nature of digit signal 1 in the next magnetic instruction word. Similarly this output is used to reset the five staticisor triggers S2 to S6 so that they also are ready to be set in accordance with the nature of digit signals 2 to 6 in the next instruction word. It will thus be seen that as assumed, the triggers 100 and 101, and S2 to S6 would be off at the time that the present magnetic instruction word was applied to gate 82.

So far no mention has been made of the function of digit signal 7 in the magnetic instruction word and the action of the triggers S7R and S7W and the associate circuit elements as they have no effect on the magnetic transfer ordered by the present magnetic instruction word.

To complete the description, their action will now be described. As digit signal 1 is a nought, there will be no output from the gate 102 to be applied to the inhibiting connection of trigger S7R by means of the lead 115, and so the trigger S7R which controls the read mechanical selector RM will not be disturbed. The trigger 100, which has not been put on, does not produce an output to be applied to the inhibiting connection of a gate 120, through which the gate 103 is connected to the inhibiting connection of the trigger S7W, which controls the write mechanical selector WM. Thus the output from the gate 103, which will occur when a P4 pulse is applied, is allowed to reset the trigger S7W so that it is prepared to be set to the state required by the pending magnetic instruction word. During the minor cycle when the magnetic instruction word passes through the gate 82, there is no output from the trigger 100 applied to the gates 113 and 114 and hence gate 113 will allow the magnetic instruction word to be applied to gate 116, while the gate 114 will not be open and the magnetic instruction word is not applied to gate 117. When a P7 pulse is applied to gate 116, digit signal 7 in the magnetic instruction word, which is a one, is applied to the trigger S7W which thereupon produces an output.

Now the trigger S7W was reset due to a resetting pulse during the immediately preceding digit period 4, which in the machine being described, occurred three microseconds ago. In the present case the trigger S7W has been producing a continuous output for many milliseconds which is momentarily interrupted before being recontinued and the trigger and its output circuits are designed to produce an output which is in effect continuous in the present circumstances.

The write mechanical selector WM will consequently maintain the position of the write head assembly and the not-equivalent circuit E2 will detect no non-equivalence between the output direct from the trigger S7W and this output through the one millisecond delay 118. Thus no output will be delivered to a trigger 109 and hence no output will be applied to the inhibiting connection of the gate 111, as previously assumed, and the operation of the transfer-timer trigger 101 is not affected.

The operation of the circuits on receipt of another typical magnetic instruction word will now be described. It will be assumed that the first typical magnetic instruction word of which the first seven digits are 0101101 has just been obeyed and that the first seven digits of this instruction word are 0110100. Thus a write transfer to track 11 with the write head assembly in mechanical position 0 is ordered and as the write assembly is in mechanical position 1 a change in the position of the assembly will be required to take place before the writing transfer can take place.

The gates 81, 82, 101, and 102 operate as previously described, the trigger 100 remains off, and the staticisor triggers S2 to S6 are set up in accordance with the digit signals 2 to 7. As a result the electronic tree is set up to produce an output on, and only on, line L11. The magnetic instruction word passes through gate 113 as before (there being no output from trigger 100) and digit signal 7 passes through gate 116 and is applied to trigger S7W. The trigger, although previously producing a continuous output, was reset during digit period 4 by the output from gate 103, and, as digit signal 7 is a nought, the trigger will remain reset. The write mechanical selector WM will thereupon commence to operate to move the write head assembly to position 0.

This movement requires a large proportion of 100 milliseconds to be completed, and so it is necessary to prevent the transfer timer 101 commencing a magnetic transfer until 100 milliseconds has elapsed. This prevention is carried out as follows. After the trigger S7W has been reset for several microseconds, the not-equivalent circuit E2 will detect a non-equivalence between its output direct and its output 1 millisecond ago as received through the delay unit 118. An output will be delivered to the trigger 109 which thereupon maintains an output on the inhibiting connection of the gate 111 until it is reset 100 milliseconds later by its own output applied through a delay unit 110.

The output of the end element 106, which is the normal means by which the transfer-timer 101 is put on, has of course been stopped at the gate 111 and it is necessary for the transfer-timer 101 to be put on by a pulse from the end element 112, which will occur when the trigger 109 is reset.

After the transfer-timer has been put on a write magnetic transfer will take in a manner already described for the first magnetic instruction word.

A third typical magnetic transfer which involves reading digital information stored in the magnetic store and transferring it to the delay line DL7 will now be described. It will be assumed that the second typical magnetic instruction word was the last instruction obeyed and that the trigger S7R is on and the read head assembly is in mechanical position 1. The first seven digits of this instruction word will be assumed to be 1100011 and thus no change in the position of the read head assembly is required to take place.

When gate 82 is opened, digit signal 1 passes through gate 102 and as it is a one, the trigger S7R is reset and the trigger 100 put on and produces an output until it is put off at the end of the pending transfer. Digit signals 2 to 6 act in a similar manner to that already described, to order the electronic tree 83 to produce an output on one line, in this case line L17, so that the output from the read head RH17 is fed to the magnetic read unit 28.

Meanwhile during digit period 4, the output from the gate 103 is applied to trigger 104 and to gate 120, but it is unable to reset the trigger S7W due to the inhibiting output from trigger 100 applied to gate 120, and so the position of the write mechanical assembly is undisturbed. After two milliseconds the trigger 104 is reset and the end element 106 delivers an output to the gate 111, which, assuming there is no output on its inhibiting connection, allows the output of the end element 106 to put on the transfer-timer trigger 101.

As there is an output from trigger 100, the gate 107 will be open and the gate 108 will be closed and hence the gate 30 will be opened to allow magnetic clock pulses from the magnetic clock pulse generator 20 to pass through, while all the write gates W1 to W32 will remain closed.

Thus the gate 19 will be opened and the gate 17 will be closed on the application of each magnetic clock pulse and the output of the magnetic read unit 28 will be passed to the terminal K and so to the delay line DL7. This transfer will continue until the count 33 unit 88 produces an output in a manner previously described and turns off the transfer-timer 101. The trigger 100 and the staticisor triggers S2 to S6 are also reset and the circuits are ready to obey another magnetic instruction word.

It has however, been assumed that there has been no output on the inhibiting connection to the trigger 111. The reason for this assumption is as follows. As the trigger 100 produces an output as soon as digit signal 1 in the magnetic instruction word passes through the gate 102, the gate 113 is closed while the gate 114 is open while the magnetic instruction word passes through the gate 82. The magnetic instruction word is thus applied to the gate 114 and digit signal 7, which is a one, passes through this gate and turns the trigger S7R on. As the read head assembly is in position 1, trigger S7R was on for several milliseconds before it was reset by digit signal 1, and so the trigger S7R will continue to produce an output after a break of a few microseconds. This break in the output can be shortened, if necessary, so that it cannot be detected, by inserting a short delay in the lead 115. As trigger S7R then produces a continuous output, the read mechanical selector RM will remain undisturbed, the not-equivalent circuit E1 will not detect any difference between the direct output from the trigger S7R and the output through the delay unit 119, and in a manner previously described, no output will be sent to the trigger 109 and on to the inhibiting connection of the gate 111.

It will be clear from the foregoing descriptions of three typical magnetic transfers that if in the case of the read transfer just described, the read head assembly had been in position 0 when the transfer was ordered, the non-equivalent circuit E1 would have detected a difference between the two signals on its input connections and hence an inhibiting output would be applied to the gate 111 for 100 milliseconds, so delaying the read transfer until the read mechanical selector RM had directed the movement of the read head assembly from position 0 to position 1.

The invention as applied to an electronic digital computer has now been fully described with reference to Figures 1 to 10 of the drawings. Several of these figures, such as Figures 1, 4, 8, 9 and 10, are diagrams indicating the logical operation of electronic circuits in accordance with a convention known to those skilled in the electronic computer art. Most of the circuit elements are fully explained in co-pending patent application Ser. No. 202,615, now Patent No. 2,686,632. Of the remaining circuit elements, a magnetic wheel and associated write and read heads have been described in co-pending patent applications Ser. No. 146,446, now Patent No. 2,734,186, issued February 7, 1956; Ser. No. 146,445, now Patent No. 2,652,554, issued September 15, 1953; and Ser. No. 196,776, now Patent No. 2,694,192, issued November 9, 1954, while a magnetic write unit and a magnetic read unit has been described in co-pending patent application Serial No. 165,434. The count 33 and unit 88 shown in Figures 8 and 10 has already been described with references to Figure 8.

Figure 11:
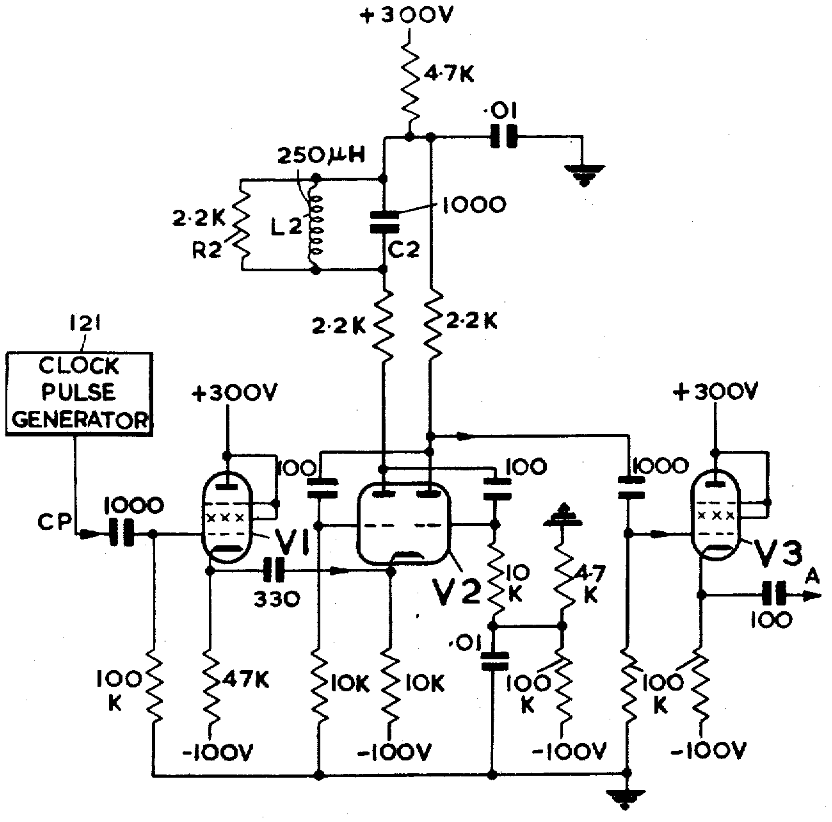

The description of the invention as applied to an electronic digital computer will now be completed by giving circuit details of the magnetic clock pulse generator 20 and the delay unit 99, the magnetic write unit 27, the gates 17, 18, 19 and 30 and the interconnections between these circuits as shown in Figure 10. The magnetic clock pulse generator 20 and delay unit 99 will be described with reference to Figures 11, 12 and 13, the magnetic write unit 27 and the gates 17, 18, 19 and 30 will be described with reference to Figures 14 and 15. All double triode valves in these circuits are type 6J6, and the pentode valves in Figure 11 are type CV138. The values of the various capacitors given are in micro-farads if they are less than unity, and micro-microfarads if greater than unity. Waveforms showing the voltage changes taking place at various points in these circuits are depicted in Figure 16.

The magnetic clock pulse generator 20 which is required to produce a pulse during every ninth digit period operates as follows. As shown in Figure 11, an output of the standard clock pulse generator 121 of the computer, the waveform of which is a succession of pulses CP at 1 microsecond intervals 160 as shown in Figure 16(*a*), is applied through a cathode follower valve VI, which sharpens the pulses to the cathode of a multivibrator V2. The multivibrator V2 is arranged so that its left-hand valve conducts for two microseconds and its right-hand valve conducts for one microsecond. Two out of every three successive clock pulses therefore serve to synchronise the change-over times, while the third clock pulse must be non-effective. The voltage waveform on the grid of the right-hand valve in the absence of any special arrangements in the anode circuit of the valve is shown by the chain dotted line in Figure 16(*c*). Examination of this figure will show that there is danger of the valve V2 being changed-over by the pulses which are required to be noneffective. This danger is removed by incorporating a parallel tuned circuit comprising an inductance L2 and a capacitor C2 tuned to 333 kc./s. in the anode circuit of the left valve. The oscillations in this circuit are damped by a resistor R2 so that their amplitude is such that they modify the voltage waveform on the right-hand grid to the extent shown in Figure 16(*b*), with the result that the waveform on this grid is modified to that shown by the solid line in Figure 16(*c*).

Figure 12:
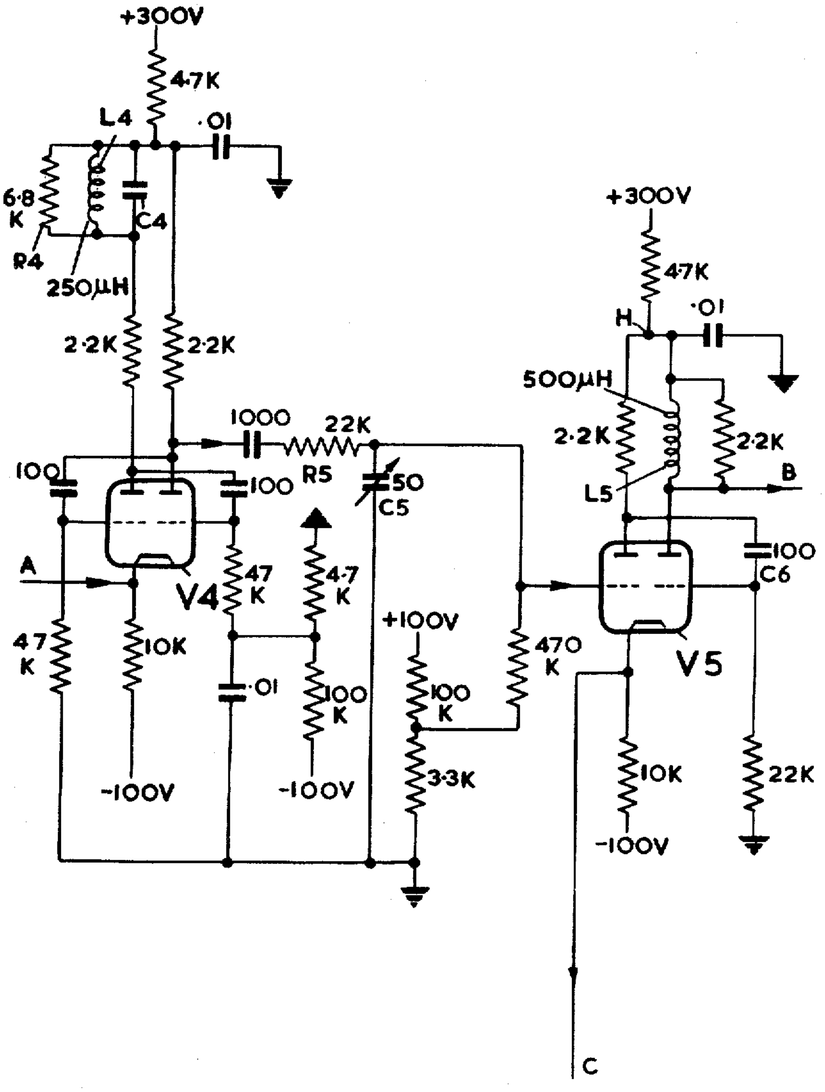
Figure 16:
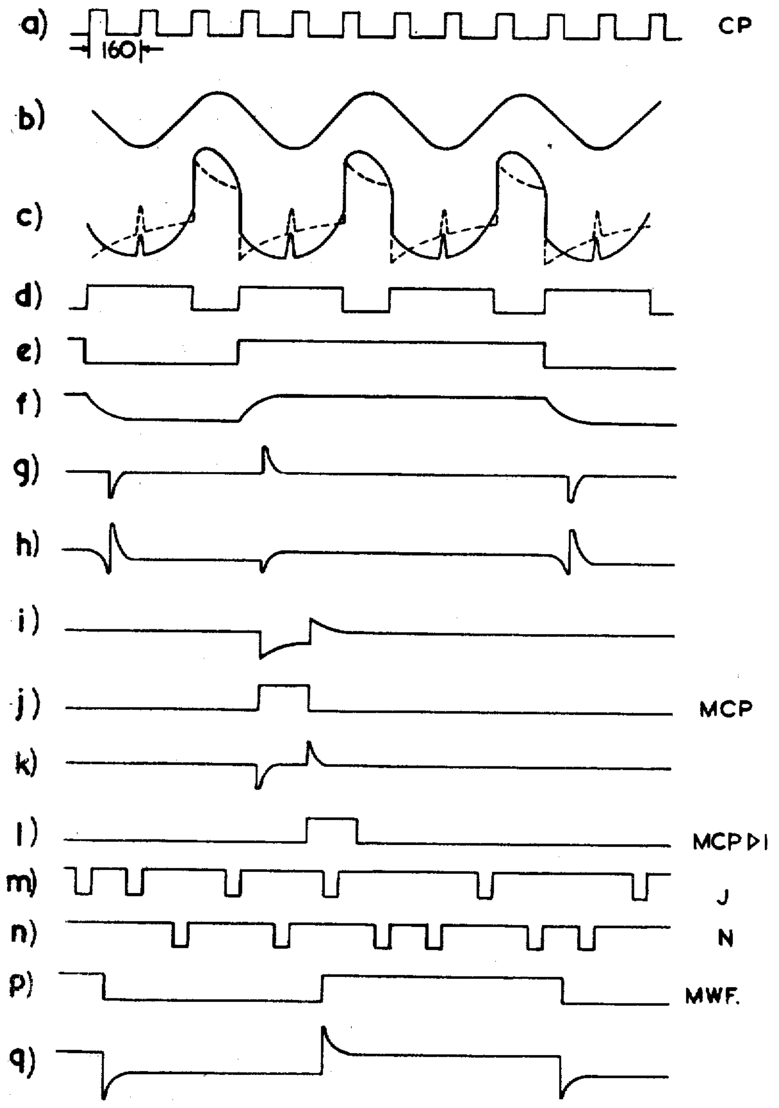
Figure 16 shows various voltage waveforms occurring in the circuits shown in Figures 11 to 15.

The anode of the right-hand valve of valve V2, the voltage waveform on which is shown in Figure 16(*d*), is connected through a cathode follower valve V3 and terminal A to the cathode of a second multivibrator V4 show in Figure 12, and produces at the positive-going steps in the voltage waveform, a momentary decrease in its cathode current. This produces a positive pulse, on the conducting anode of valve V4 which is communicated to the opposite grid. The multivibrator V4 is arranged so that its left-hand valve conducts for six microseconds and its right-hand valve conducts for three microseconds. Two out of every three successive positive going pulses on the cathode serve to produce a change-over while the third must be non-effective. The multivibrator V4 thus is required to operate in a similar manner to multivibrator V2 but at a third of the repetition frequency. The anode circuit of the left-hand valve is therefore provided with a parallel tuned circuit comprising a capacitor C4, an inductance L4 and a damping resistor R4, resonant at 111 kc./s., with the result that the triggering action of every third pulse is repressed and the voltage waveform on the anode of the right-hand valve is as shown in Figure 16(*e*).

This output is applied to the grid of the left-hand valve of a multivibrator valve V5 through an integrating circuit comprising the resistor R5 and capacitor C5, which imposes a slight delay designed to bring the magnetic clock pulses produced in the following valve stages into synchronism with the digit signals from J in a manner which will be clear when Figures 16(*e*) and 16(*m*) are compared. The operation of the multivibrator V5 will now be described with reference to Figures 16(*f*), 16(*g*), and 16(*h*) which show the waveforms of the voltages existing on the left-hand valve grid, the right-hand valve anode, and the common cathode respectively. When a negative going change occurs in the voltage applied to the left-hand valve grid of the multivibrator V5, the left-hand valve is cut off, its anode potential rises and the grid of the right-hand valve is pulled up with it due to the interconnecting capacitor C6. The right-hand valve current therefore momentarily increases at a greater rate than the left-hand valve current decreases and the total cathode current of the valve V5 momentarily increases and a voltage pulse is produced on the cathode as shown in Figure 16(*h*). When a positive going change occurs on the left-hand valve grid and the left-hand starts to conduct, the left-hand valve anode voltage falls and drives down the right-hand valve grid voltage through the capacitor C6 so that the right-hand valve is sharply cut off and no increase in total valve current and therefore no voltage pulse on the cathode will occur at this time. The output from the terminal C therefore consists of series of pulses at nine microseconds intervals and is used in the magnetic write unit 27 in a manner which will be described with reference to Figure 14.

Figure 13:
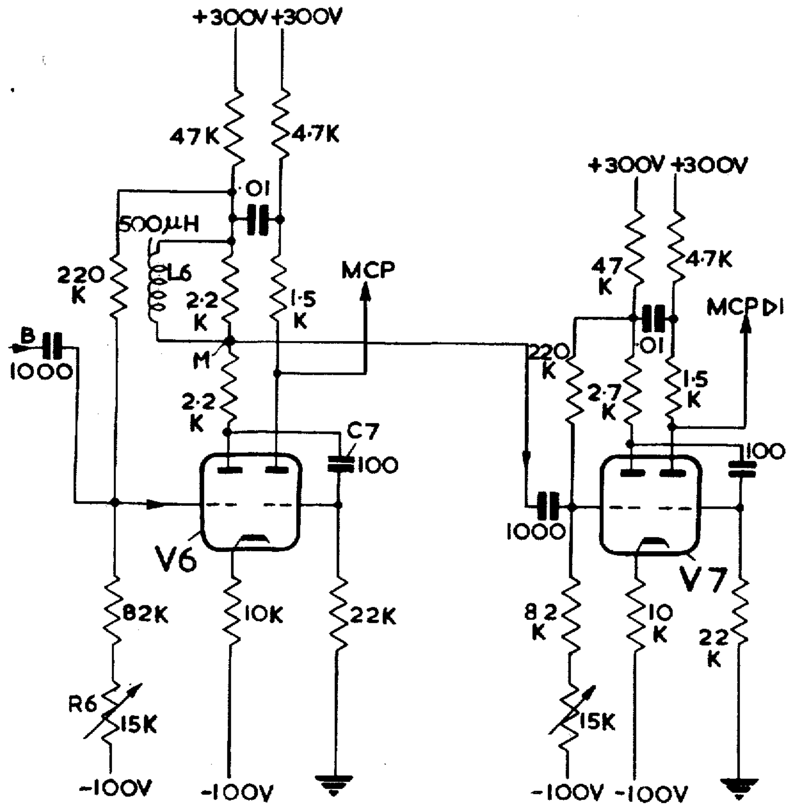

The voltage waveform on the anode of the right-hand valve is not a rectangular waveform in anti-phase with the waveform on the left-hand anode but is as shown in Figure 16(*g*), as after the valve has changed over in either sense, the inductance L5 discharges and restores the anode voltage to the steady voltage at the point H. The anode of the right-hand valve of the multivibrator V5 is connected through the terminal B to the grid of the left-hand valve of a trigger V6, as shown in Figure 13. The left-hand valve of V6 is normally cut off, but is made to conduct when a positive going pulse is applied to its grid. The anode voltage falls rapidly at this moment and drives the voltage on the grid of the right-hand valve down through the interconnecting capacitor C7. The voltage waveform on the grid and anode of the right-hand valve of valve V6 is shown in Figures 16(*i*) and 16(*j*) respectively. As shown in Figure 16(*i*) the right-hand grid potential rises as the capacitor C7 discharges until its potential rises to the cut-off potential and the right-hand valve conducts. This is designed and can be adjusted by the resistor R6 to take place about one microsecond after the left-hand valve was made to conduct, so that the multivibrator V6 is restored to its normal state and a one microsecond positive pulse is produced on the anode of the right-hand valve for each positive-going pulse applied to the grid of the left-hand valve. Thus a succession of one microsecond pulses at nine microsecond intervals which constitute a train of magnetic clock pulses MCP is generated on the anode of the right-hand valve.

A train of magnetic clock pulses delayed by one microsecond as shown in Figure 16(*l*) is obtained from a further trigger valve V7 in the following manner. The voltage waveform at a point M in the anode circuit of the left-hand valve of V6 is arranged to be as shown in Figure 16(*k*) by the following action of an inductance L6. When the current to the left-hand anode of valve V6 changes a sharp voltage pulse is produced across the inductance L6 which is communicated to the left-hand grid of the valve V7. The valve V7 is arranged to operate in a similar manner to valve V6 so that the left-hand valve is made to conduct for one microsecond at nine microsecond intervals on the application of the positive going pulses from the valve V6 and produce a train of one microsecond pulses on the anode of the right-hand valve which constitute the output from the delay unit 95 shown in Figure 8 or the delay unit 99 shown in Figure 10.

Figure 14:
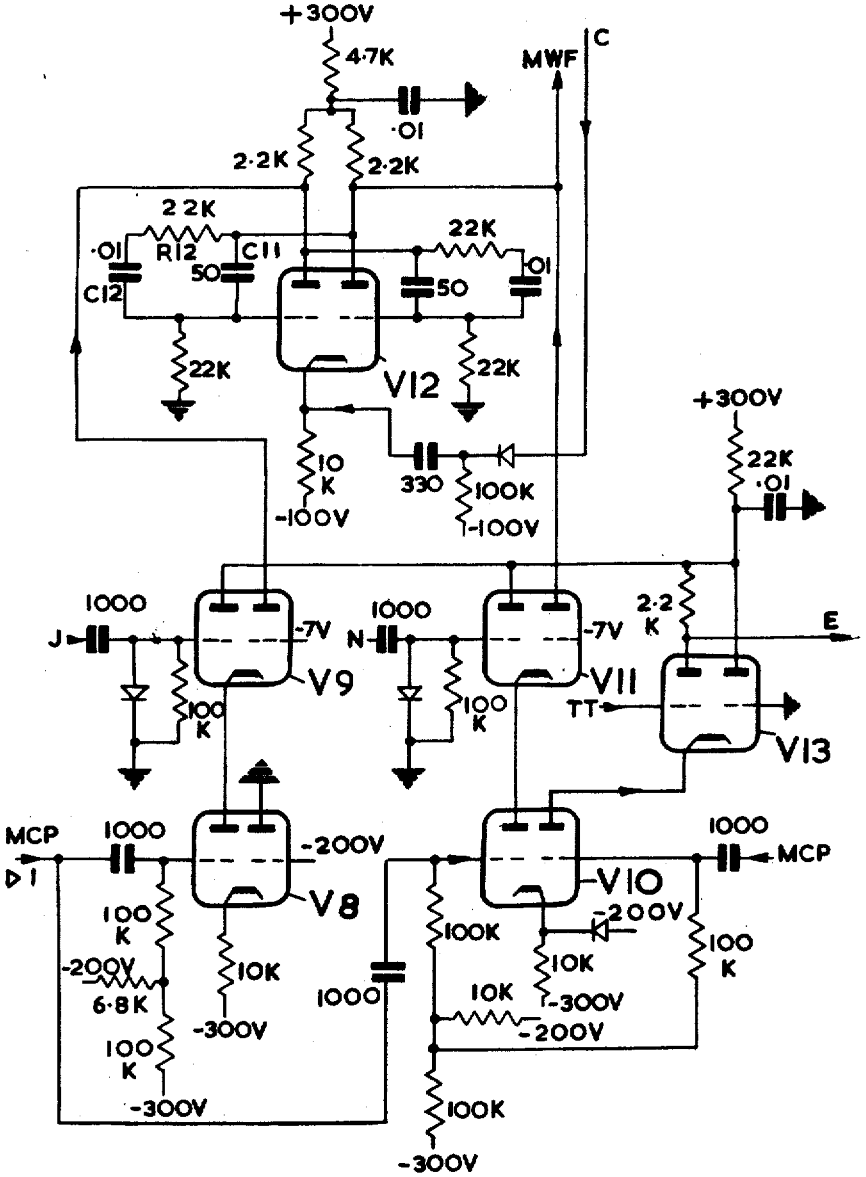

The operation of the magnetic write unit 27 now will be described with reference to Figure 14. This unit is required to produce a voltage having a waveform of which a typical sample is shown in Figure 2(*d*) in response to a train of digit signals as shown in Figure 2(*c*), which is the result of passing a typical sample of digit signals as shown in Figure 2(*a*) from J through the gate 18 controlled by magnetic clock pulses as shown in Figure 2(*b*). A description will be given of the operation of the unit 28 when a typical sample of digit signals as shown in Figure 16(*m*) are applied from J to the gate 18 as shown in Figure 10.

Magnetic clock pulses delayed by one microsecond from the valve V7 are applied to the grid of the left-hand valve of a double valve V8 which is connected in the cathode circuit of a double valve V9, these two valves constituting part of the gate 18. Digit signals from J (a one being represented by negative going pulses as shown in Figure 16(*m*)) are applied to the grid of the left-hand valve of V9 with the result that the right-hand valve of V9 conducts only when the digit signal from J is a one at the time a magnetic clock pulse delayed 1 occurs. This does occur in the sixth digit period shown in Figure 16 and as a result, the anode potential on the left-hand valve in the magnetic waveform generator valve V12 is reduced.

Valves V10 and V11 constitute the other part of gate 18 and magnetic clock pulses delayed 1 are applied to the left-hand grid of valve V10 while digit signals N, as shown in Figure 16(*n*), which are the negation of digit signals J, are applied to the left-hand grid of valve V11. Valves V10 and V11 operate in a similar manner to the valves V8 and V9 with the result that the right-hand valve of valve V11 conducts only when the digit signal from N is a one, that is when the digit signal from J is not a one, at the time a magnetic clock pulse delayed 1 occurs. This does not occur during the period shown in Figure 16, but when it does occur the anode potential of the right-hand valve of the valve V12 will be reduced.

The valve V12 is connected as a trigger valve and thus it will be seen that the combined action of valves V8 to V11 is to make the left-hand valve conduct if the digit signal from J is a one and the right-hand valve conduct if it is a nought when a magnetic clock pulse delayed 1 occurs. Thus the voltage waveform MWF on the anode of the right-hand valve changes as shown in Figure 16(*p*) during the sixth digit period.

In order to make the voltage waveform on the anode of the right-hand valve into the required magnetic waveform MWF in which there is a voltage change in the middle of each magnetic digit period (as shown in Figure 2(*d*)), the potential (as shown in Figure 16(*h*)) on the cathode of valve V5 in the magnetic clock pulse generator 20 is applied through terminal C to the cathode of the valve V12 to reverse its state when the positive pulses on the cathode of valve V5 occur.

The rapidity with which the valve V12 changes its state is increased by providing two parallel operating interconnections between each anode and its grid of the other valve of the pair. Thus the left-hand valve grid is connected to the right-hand valve anode through a capacitor C11 which rapidly transmits the change in anode potential to the grid, and also through a capacitor C12 and resistor R12 which sustains the grid at an intermediate potential until it is changed by the action of a positive pulse from the cathode of valve V5. The voltage waveform on the grid of the left-hand valve of valve V12 is thus as shown in Figure 16(*q*).

The magnetic waveform voltage MWF is applied to an amplifier feeding the write heads in a manner well known to those skilled in the art.

Figure 15:
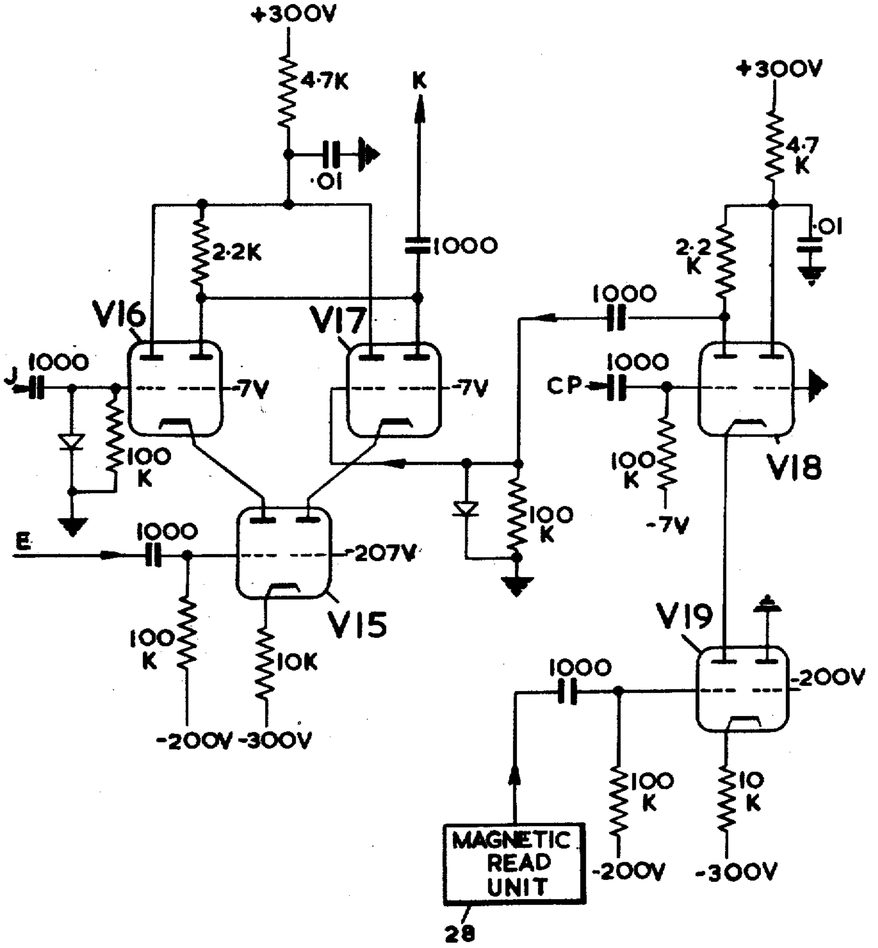

A description of the gates 17, 19 and 30 as shown in Figure 10 will now be given with reference to Figures 14 and 15. These gates are typical of many other similar gates shown in Figures 1, 4, 8 and 10.

The circuits will first be described when a read transfer is not taking place and thus the contents of the acoustic delay line DL7 are passing from J to K. At this time the voltage TT from the transfer-timer trigger 101, which is applied to the left-hand grid of a double valve V13 shown in Figure 14, is arranged to be negative with respect to the right hand grid held at earth potential so that the left-hand valve is non-conducting and its anode potential high. The potential on the anode of the left-hand valve is applied through terminal E to the left-hand grid of a double valve V15 shown in Figure 15 and is arranged, in this condition, to be positive with respect to the right-hand grid potential of −207 volts. The left-hand valve of valve V15 is thus able to conduct, and thus one of the valves of the double valve V16 is permitted to conduct. The digit signals J applied to the left-hand grid of valve V16 are thus able to be reproduced on the anode of the right-hand valve and so passed to the terminal K.

When a read transfer is taking place the contents of the acoustic delay line DL7 must be prevented from passing from J to K during the occurrence of a magnetic clock pulse and the output from the magnetic read unit 28 passed to K instead. This is accomplished in the following manner. The left-hand valve of valve V13 is arranged to conduct during, and only during, magnetic clock pulse periods when a read transfer is ordered by applying a voltage from the transfer-timer trigger 101 to the left-hand grid of valve V13 which is positive with respect of the right-hand grid potential, and by applying magnetic clock pulses MCP to the grid of the right-hand valve of valve V10 which render it conducting. When the left-hand valve of valve V13 conducts and its anode voltage is thereby reduced, the left-hand valve of valve V15 is arranged to be cut off and the right-hand valve consequently capable of conducting. At these times valve V16 cannot conduct and therefore digit signals cannot be passed from J to K.

On the other hand, valve V17, which cannot conduct at other times, can now conduct and the output of the magnetic read unit 28, after it has passed through the double valves V19 and V18 (through which it is formed into a train of pulse signals by the action of the clock pulses CP applied to its left-hand grid), is applied to the left-hand grid of V17 and is able to be reproduced on the right-hand anode and so passed to K.

What we claim is:

1. In a digital data recording apparatus for recording information that consists of a group of sequential digits, means for repetitively presenting the group $n$ times, means for recording each $n$th digit throughout all the presentations considered as a succession, where $n$ is an integer relatively prime to and less than the number of digits in the group, all the digits in the group being thus recorded in a sequence that is different from the sequence in which they occur in the original group.

2. In a digital data recording apparatus for recording information that consists of a group of sequential digits, means providing $m$ channels by which digits to be recorded are transferred, means for repetitively presenting said group $n/m$ times and transmitting over each channel a respective series of digits, said digits immediately adjacent each other in each series being $n$ digit spaces apart in the original group, the digits in a channel being $n/m$ digit spaces in the original group from the correspondingly positioned digits in the series transmitted over another channel, $n/m$ being an integer prime relatively to the number of digits in the original group.

3. In a digital data recording apparatus, a source of digital information containing a set of N digit signals, means to make the set of digit signals repetitively available $n$ times during a succession of $n \times N$ digit periods, where $n$ is an integer, relatively prime to and less than N, a magnetic recording wheel, means to rotate the wheel in timed relation to the presentation of digit signals from the source so that the wheel rotates not more than once during $n \times N$ digit periods, a channel for transferring digit signals to the recording wheel, a gate in said channel, means timed in relation to the time of availability of the set of signals to open the gate to record a signal and thereafter cyclically to open the gate to pass the digit signal presented $n$ digit periods in the succession after the digit signal recorded so that after $n$ presentations of the set of signals all the digit signals are transferred to magnetic storage on the wheel and the time for recording each digit signal is $n$ digit periods.

4. In a digital data recording apparatus, a source of digital information containing a set of N digit signals, means to make the set of digit signals repetitively available $n$ times in cyclic order during a succession of $n/m \times N$ digit periods, a magnetic recording wheel, means to rotate the wheel in timed relation to the presentation of digit signals from the source, $m$ channels for transferring digit signals to the recording wheel, where $m$ is an integer which is a factor of $n$ such that $n/m$ is relatively prime to N, a gate in each channel, means timed in relation to the time of availability of the set of signals to open a gate to record a signal and thereafter cyclically to open the gate in each channel to pass the digit signal presented $n/m$ digit periods in the continuum after the digit signal recorded through the channel next cyclically ahead thereof so that after $n/m$ presentations of the set of signals all the digit signals are transferred to magnetic storage on the wheel and the time for recording each digit signal is $n$ digit periods.

5. In a digital data recording apparatus, a magnetic recording wheel whereon are recorded digit signals as described in claim 4, a plurality of reading heads responsive to magnetically recorded signals set in spaced relation to each other and operatively disposed around the magnetic wheel in operative relation thereto to respond to the respective digit signal recordings on the wheel presented to each head, a transmission channel connected to each reading head, gate means in each channel to control transmission of signals therethrough and timing means to open the gates in a cyclic sequential order such that the signals recorded on the magnetic wheel are read off in the same order as that in which they occurred before transfer to the magnetic wheel.

6. In an electronic digital data recording apparatus, a source of digital information containing a set of N digit signals, means to make the set repetitively available $n/m$ times during a continuum of $n/m \times N$ digit periods, digit signal responsive means to record digit signals, said means requiring more time than a digit signal period to record any individual signal, $m$ channels for transferring digit signals to the recording means, where $m$ is an integer such that $n/m$ is relatively prime to N, the signals through each channel being recorded in a group, a gate in each channel, means timed in relation to the time of availability of the set of signals to open a gate to record a signal and thereafter cyclically to open the gate in each channel to pass the digit signal presented $n/m$ digit periods in the continuum after the digit signal recorded through the channel next cyclically ahead thereof so that after $n/m$ presentations of the set of signals all the digit signals are recorded and the time for recording each digit signal is $n$ digit periods.

7. In an electronic digital data recording apparatus as described in claim 6, a respective reading device responsive to the recorded digit signals and positioned to respond to the recorded signals in each group as the recorded signals are presented to the respective devices, a transmission channel connected to each reading device, gate means in each channel to control transmission of signals therethrough and timing means to open the gates in a cyclic sequential order such that the signals recorded are read off in the same order as that in which they occurred before transfer to the recording device.

8. In a digital data recording apparatus for recording a series of N electrical digit signals, means for presenting said digit signals cyclically in a repetitive form to a store, said store requiring a certain minimum time to record a digit signal which is not more than $n$ times the digit period of the signals, said store having $m$ input channels to said store, where $m$ is not more than $n$ and $n/m$ is relatively prime to N, means for selecting a first set of digit signals in each successive group of $n$ consecutive digit signals, means for transferring said set of first digit signals through an input channel to said store, means for selecting a second set of digit signals in each successive group, and means for transferring this set of second digit signals through an input channel to said store, and so on for the remaining digit signals in each group in such a manner that any given channel passes only one set of digit signals at a time and that $m$ sets of digit signals are transferred to said store during the first presentation of the digit signals until all of the digit signals are transferred.

9. A digital data recording apparatus in accordance with claim 5 which has a recording head for each channel for transferring digit signals to the recording wheel, the recording heads and reading heads being positioned apart along the recording wheel by an integer number of $n$th parts of the length of the recording track.

10. In a digital data recording apparatus, a magnetic recording wheel whereon are recorded digit signals as described in claim 3, a reading head responsive to magnetically recorded signals in operative relation to the magnetic wheel to respond to the digit signal recordings on the wheel presented to the head, a transmission channel connected to the reading head, gate means in the channel to control transmission of signals therethrough and timing means to open the gate means during every $n$th digit period whereby the recorded signals are read off in the same order as that in which they occurred before transfer to the magnetic wheel.

11. A digital data recording apparatus in accordance with claim 10 and in which the channel has a recording head for transferring digit signals to the recording wheel, the channel recording head and reading head being positioning apart along the recording wheel by an integer number of $n$th parts of the length of the recording track.

References Cited in the file of this patent

UNITED STATES PATENTS

| | | |
|---|---|---|
| 2,052,539 | Frischknecht et al. | Aug. 25, 1936 |
| 2,080,100 | Tauschek | May 11, 1937 |
| 2,304,813 | Gibbs et al. | Dec. 15, 1942 |
| 2,375,950 | Schlesinger | May 15, 1945 |
| 2,410,156 | Flory | Oct. 29, 1946 |
| 2,411,648 | Brauer et al. | Nov. 26, 1946 |
| 2,418,521 | Morton et al. | Apr. 8, 1947 |
| 2,540,654 | Cohen et al. | Feb. 6, 1951 |
| 2,557,086 | Fisk et al. | June 19, 1951 |
| 2,564,403 | May | Aug. 14, 1951 |
| 2,576,676 | Elbourn et al. | Nov. 27, 1951 |
| 2,609,439 | Marshall et al. | Sept. 2, 1952 |
| 2,614,169 | Cohen et al. | Oct. 14, 1952 |
| 2,620,389 | Potter | Dec. 2, 1952 |
| 2,623,171 | Woods-Hill et al. | Dec. 23, 1952 |

OTHER REFERENCES

"Transfer Between External and Internal Memory," by C. B. Sheppard; Proceedings of a Symposium on Large Scale Digital Calculating Machinery; Harvard University Press, Cambridge, Mass. Copyright 1948; pages 267–273.

Publication I, Electronic Engineering, July 1949, 340–184.13, pp. 234–238.

Publication II, Proceedings of a Second Symposium on Large-Scale Digital Calculating Machinery, held September 1949 at Harvard University, vol. XXVI, pp. 11–19. (Copy in Div. 23.)